US012455541B2

(12) United States Patent
Honma

(10) Patent No.: US 12,455,541 B2
(45) Date of Patent: Oct. 28, 2025

(54) EQUIPMENT MANAGEMENT DEVICE, EQUIPMENT MANAGEMENT METHOD, AND PROGRAM

(71) Applicant: Sharp NEC Display Solutions, Ltd., Tokyo (JP)

(72) Inventor: Kazuya Honma, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 500 days.

(21) Appl. No.: 17/949,793

(22) Filed: Sep. 21, 2022

(65) Prior Publication Data
US 2023/0016819 A1 Jan. 19, 2023

Related U.S. Application Data

(63) Continuation of application No. PCT/JP2020/013033, filed on Mar. 24, 2020.

(51) Int. Cl.
*G05B 15/02* (2006.01)
*G06F 3/16* (2006.01)
(Continued)

(52) U.S. Cl.
CPC ............. *G05B 15/02* (2013.01); *G06F 3/16* (2013.01); *G06V 20/52* (2022.01);
(Continued)

(58) Field of Classification Search
CPC .......... G05B 15/02; G06F 3/16; G06F 3/167; G06V 20/52; G06V 2201/02;
(Continued)

(56) References Cited

U.S. PATENT DOCUMENTS 10,824,971 B1 * 11/2020 Davis ..................... G06Q 10/20
2003/0103075 A1 * 6/2003 Rosselot ................. H04L 41/22
348/E7.083
(Continued)

FOREIGN PATENT DOCUMENTS

| JP | 2011-027998 A | 2/2011 |
| JP | 2012-128395 A | 7/2012 |
| JP | 2017-010269 A | 1/2017 |
| JP | 2019-144167 A | 8/2019 |
| JP | 2019-204349 A | 11/2019 |

(Continued)

OTHER PUBLICATIONS

International Search Report (ISR) (PCT Form PCT/ISA/210), in PCT/JP2020/013033, dated Jun. 30, 2020.

*Primary Examiner* — Christopher W Carter
(74) *Attorney, Agent, or Firm* — McGinn I.P.Law Group, PLLC

(57) ABSTRACT

The equipment management device includes an information collection unit, a specific state detection unit, a cause estimation unit, and a countermeasure process execution unit. The information collection unit acquires a video of a conference room or a sound of the conference room. The specific state detection unit detects that equipment provided in the conference room is in a specific state on the basis of a result of analyzing the video or the sound. The cause estimation unit acquires equipment information about the equipment when the equipment has been detected to be in the specific state and estimates a cause of the specific state on the basis of the equipment information. The countermeasure process execution unit selects and executes a countermeasure process to be executed on the basis of the estimated cause.

19 Claims, 12 Drawing Sheets

(51) Int. Cl.
*G06V 20/52* (2022.01)
*H04L 12/18* (2006.01)
*H04N 7/18* (2006.01)
*H04N 17/00* (2006.01)

(52) U.S. Cl.
CPC ......... *H04L 12/1818* (2013.01); *H04N 7/183* (2013.01); *H04N 17/00* (2013.01)

(58) Field of Classification Search
CPC ............. H04L 12/1818; H04L 12/1827; H04L 12/1863; H04N 7/183; H04N 17/00; H04N 7/147
See application file for complete search history.

(56) References Cited

U.S. PATENT DOCUMENTS

| | | | |
|---|---|---|---|
| 2006/0085689 A1* | 4/2006 | Bjorsne | G06F 11/0748 |
| | | | 714/39 |
| 2012/0130818 A1 | 5/2012 | Katsuki | |
| 2016/0006576 A1* | 1/2016 | Matsuzaki | G06Q 10/00 |
| | | | 709/224 |
| 2017/0205791 A1* | 7/2017 | Yang | D06F 37/04 |
| 2020/0043118 A1 | 2/2020 | Sakaguchi et al. | |

FOREIGN PATENT DOCUMENTS

| | | |
|---|---|---|
| WO | WO 01/57763 A1 | 8/2001 |
| WO | WO 2020/026367 A1 | 2/2020 |

\* cited by examiner

FIG. 12

| EQUIPMENT | SPECIFIC STATE | CAUSE | COUNTERMEASURE PROCESS |
|---|---|---|---|
| VIDEO EQUIPMENT | NO VIDEO IS OUTPUT | POWER SUPPLY IS TURNED OFF | ... |
| | | THERE IS NO INPUT SIGNAL | ... |
| | | ⋮ | ⋮ |
| | NO SOUND IS OUTPUT | POWER SUPPLY IS TURNED OFF | ... |
| | | THERE IS NO INPUT SIGNAL | ... |
| | | ⋮ | ⋮ |
| | ⋮ | ⋮ | ⋮ |
| LIGHTING | LIGHTING IS TURNED OFF | POWER SUPPLY IS TURNED OFF | ... |
| | | LIFESPAN OF LAMP | ... |
| | | ⋮ | ⋮ |
| | IGHTING IS BLINKING | LIFESPAN OF LAMP | ... |
| | | ABNORMALITY OF LAMP STARTER | ... |
| | | ⋮ | ⋮ |
| | ⋮ | ⋮ | ⋮ |
| ⋮ | ⋮ | ⋮ | ⋮ |

EQUIPMENT MANAGEMENT DEVICE, EQUIPMENT MANAGEMENT METHOD, AND PROGRAM

TECHNICAL FIELD

The present invention relates to an equipment management system, an equipment management method, and a program.

BACKGROUND ART

Conference rooms may be equipped with various types of equipment such as video equipment such as a monitor or a projector, air conditioning equipment, and lighting equipment. An example of technology for managing equipment installed in a conference room is disclosed in, for example, the following Patent Literature 1. Patent Literature 1 discloses a video conference system with a self-diagnosis function for easily and quickly detecting the presence or absence of occurrence of a failure and the location of occurrence of the failure.

CITATION LIST

Patent Literature

[Patent Literature 1]
Japanese Unexamined Patent Application, First Publication No. H10-191297

SUMMARY OF INVENTION

Technical Problem

Abnormalities (trouble) may occur when equipment provided in a conference room is used. For example, when materials, videos, and the like for use in a conference or presentation are output using video equipment, the output may not be in a desired state due to various causes. In this case, it is necessary to identify the cause and eliminate the identified cause. However, when a user is not familiar with the handling of video equipment, this work may take more time than necessary.

The present invention has been made in view of the above problems. One of the objectives of the present invention is to provide technology for supporting the work of identifying and eliminating the cause of an abnormality when the abnormality occurs in equipment provided in a conference room.

Solution to Problem

According to the present invention, there is provided an equipment management device including:
- an information collection unit configured to acquire a video of a conference room or a sound of the conference room;
- a specific state detection unit configured to detect that equipment provided in the conference room is in a specific state on the basis of a result of analyzing the video or the sound;
- a cause estimation unit configured to acquire equipment information about the equipment when the equipment has been detected to be in the specific state and estimate a cause of the specific state on the basis of the equipment information; and
- a countermeasure process execution unit configured to select and execute a countermeasure process to be executed on the basis of the estimated cause.

According to the present invention, there is provided an equipment management method including:
- acquiring, by a computer, a video of a conference room or a sound of the conference room;
- detecting, by the computer, that equipment provided in the conference room is in a specific state on the basis of a result of analyzing the video or the sound;
- acquiring, by the computer, equipment information about the equipment when the equipment has been detected to be in the specific state and estimating a cause of the specific state on the basis of the equipment information; and
- selecting and executing, by the computer, a countermeasure process to be executed on the basis of the estimated cause.

According to the present invention, there is provided a program for causing a computer to function as:
- an information collection unit configured to acquire a video of a conference room or a sound of the conference room;
- a trouble detection unit configured to detect that equipment provided in the conference room is in a specific state on the basis of a result of analyzing the video or the sound;
- a cause estimation unit configured to acquire equipment information about the equipment when the equipment has been detected to be in the specific state and estimate a cause of the specific state on the basis of the equipment information; and
- a countermeasure process execution unit configured to select and execute a countermeasure process to be executed on the basis of the estimated cause.

Advantageous Effects of Invention

According to the present invention, it is possible to reduce the workload required to identify and eliminate the cause of an abnormality when the abnormality occurs in equipment provided in a conference room.

BRIEF DESCRIPTION OF DRAWINGS

FIG. 12 is a diagram showing an example of a table to be referred to when the countermeasure process execution unit identifies a countermeasure process to be executed.

DESCRIPTION OF EMBODIMENTS

Hereinafter, embodiments of the present invention will be described with reference to the drawings. In all the drawings, similar components are denoted by similar reference signs and the description thereof will be omitted as appropriate. Also, unless otherwise identified, in each block diagram, each block represents a component of a functional unit instead of a component of a hardware unit.

Overview of Invention

<Example of Function Configuration>

Figure 1:
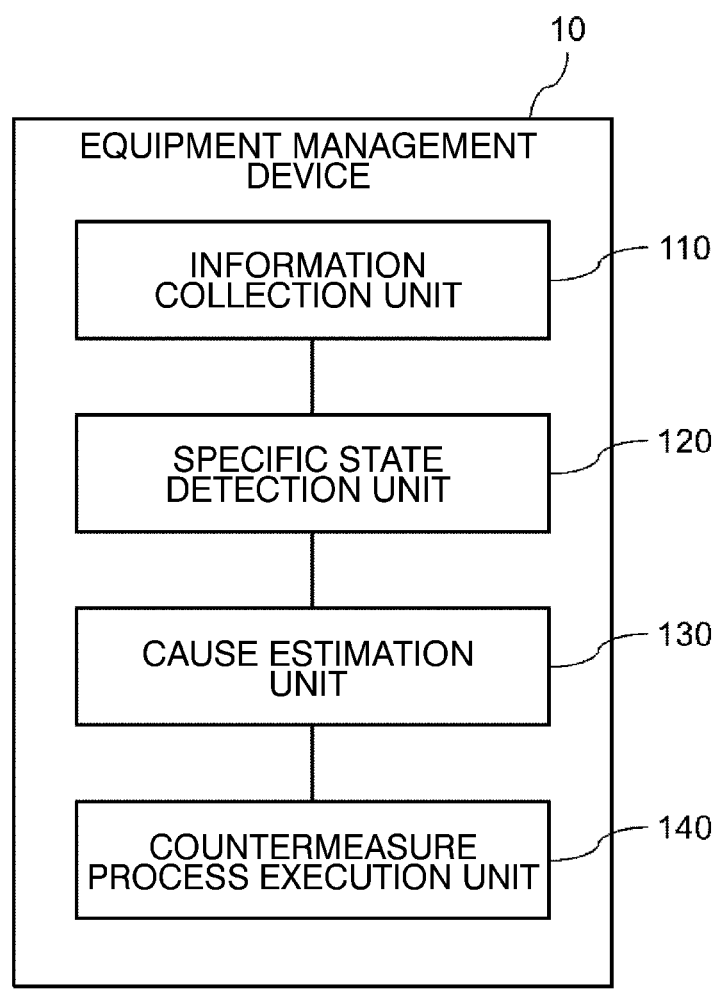
FIG. 1 is a diagram illustrating a functional configuration of an equipment management device according to the present invention.

FIG. 1 is a diagram illustrating a functional configuration of an equipment management device according to the present invention. The equipment management device according to the present invention has a function of managing equipment provided in a conference room. Here, the "equipment" described in the present description includes video equipment such as a monitor or a projector, air conditioning equipment, lighting equipment, and the like. As shown in FIG. 1, an equipment management device 10 according to the present invention has an information collection unit 110, a specific state detection unit 120, a cause estimation unit 130, and a countermeasure process execution unit 140.

The information collection unit 110 acquires a video of the conference room or a sound of the conference room. As an example, the information collection unit 110 communicates with an imaging device installed on the ceiling or wall of the conference room and acquires video data of the conference room generated by the imaging device. As another example, the information collection unit 110 communicates with a microphone installed in the conference room and acquires sound data of the conference room generated by a microphone.

The specific state detection unit 120 analyzes a video or a sound acquired by the information collection unit 110. The specific state detection unit 120 detects that the equipment provided in the conference room is in a specific state on the basis of a result of analyzing the video or the sound. Here, as a specific example of the "specific state," for example, when the equipment is video equipment, a state in which at least one of a video and a sound is not output, a state in which at least one of a video and a sound is abnormal, and the like can be mentioned. Also, when the equipment is air conditioning equipment, for example, a state in which the air conditioning is not working (it takes too long to reach a set temperature), a state in which the temperature in the conference room is unpleasant (too hot/too cold for conference attendees), and the like can be mentioned. Also, when the equipment is lighting equipment, there are a state in which the lighting is not turned on, a state in which the lighting is blinking, a state in which the lighting is unpleasant (an intensity of the lighting is too strong/too weak), and the like.

When it is detected that the equipment in the conference room is in a specific state, the cause estimation unit 130 first acquires equipment information about the equipment in which the specific state has been detected. The cause estimation unit 130 estimates a cause of the above-described specific state on the basis of the acquired equipment information. A specific example of a process executed by the cause estimation unit 130 and a specific example of the equipment information will be described below.

The countermeasure process execution unit 140 selects and executes a countermeasure process (a process for eliminating the cause) to be executed on the basis of the cause estimated by the cause estimation unit 130. A specific example of the process executed by the countermeasure process execution unit 140 will be described below.

Example of Hardware Configuration

Each functional component of the equipment management device 10 may be implemented by hardware that implements each functional component (example: a hardwired electronic circuit or the like) or may be implemented by a combination of hardware and software (example: a combination of an electronic circuit and a program that controls the electronic circuit). Hereinafter, a case where each functional component of the equipment management device 10 is implemented by a combination of hardware and software will be further described.

Figure 2:
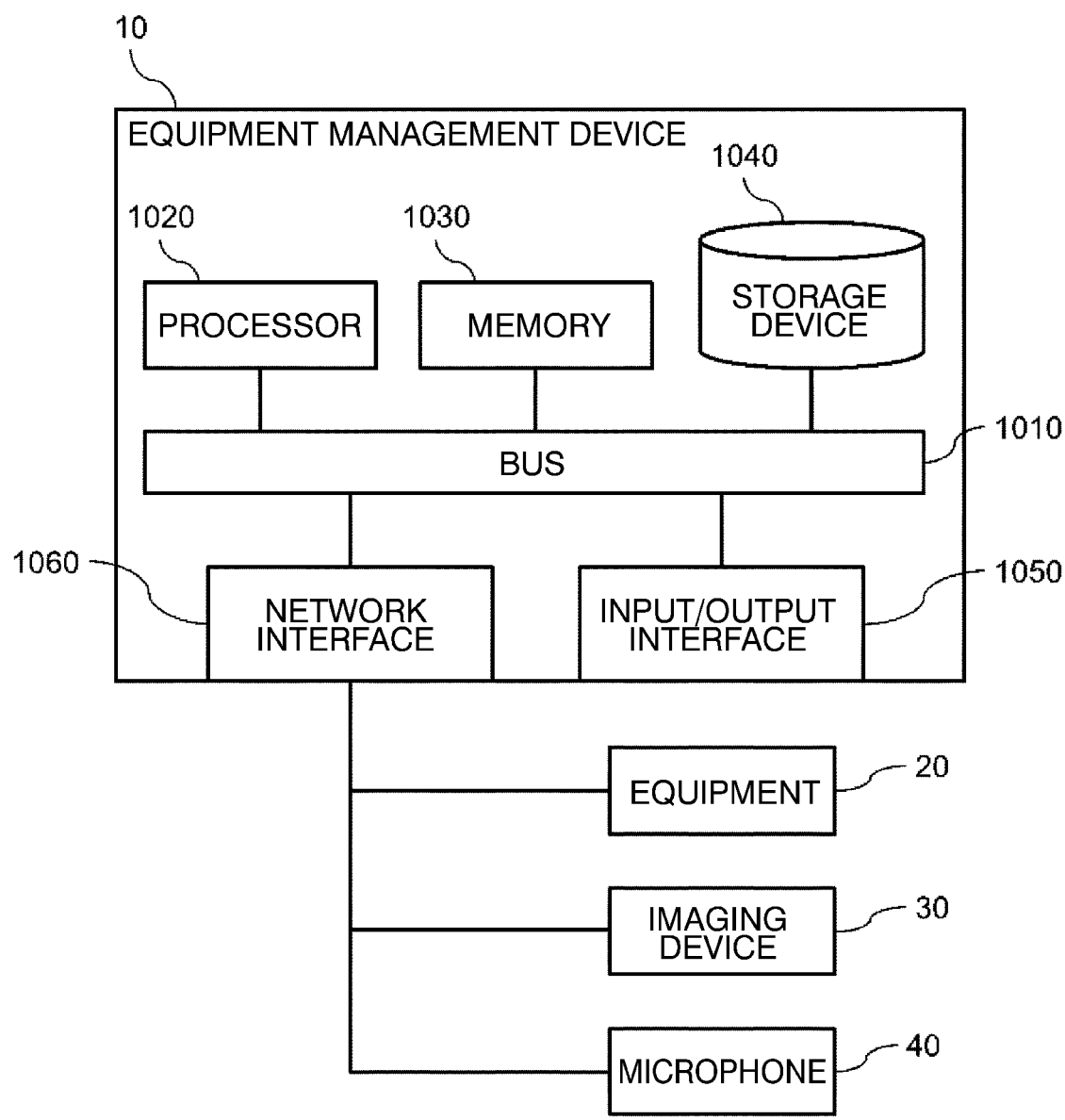
FIG. 2 is a block diagram illustrating a hardware configuration of the equipment management device.

FIG. 2 is a block diagram illustrating a hardware configuration of the equipment management device 10. The equipment management device 10 includes a bus 1010, a processor 1020, a memory 1030, a storage device 1040, an input/output interface 1050, and a network interface 1060.

The bus 1010 is a data transmission path for the processor 1020, the memory 1030, the storage device 1040, the input/output interface 1050, and the network interface 1060 to transmit and receive data to and from each other. However, a method of connecting the processor 1020 and the like to each other is not limited to a bus connection.

The processor 1020 is a processor implemented by a central processing unit (CPU), a graphics processing unit (GPU), or the like.

The memory 1030 is a main storage device implemented by a random-access memory (RAM) or the like.

The storage device 1040 is an auxiliary storage device implemented by a hard disk drive (HDD), a solid-state drive (SSD), a memory card, a read-only memory (ROM), or the like. The storage device 1040 stores program modules that implement functions of the equipment management device 10 (the information collection unit 110, the specific state detection unit 120, the cause estimation unit 130, the countermeasure process execution unit 140, and the like). When the processor 1020 reads each of these program modules to the memory 1030 and executes the program module, each function corresponding to each program module is implemented.

The input/output interface 1050 is an interface for connecting the equipment management device 10 and various input/output devices.

The network interface 1060 is an interface for connecting the equipment management device 10 to other devices (for example, the equipment 20, the imaging device 30, a microphone 40, and the like) on the network. This network is, for example, a local area network (LAN) or a wide area network (WAN). A method of connecting the network interface 1060 to the network may be a wireless connection or a wired connection.

<Flow of Process>

Figure 3:
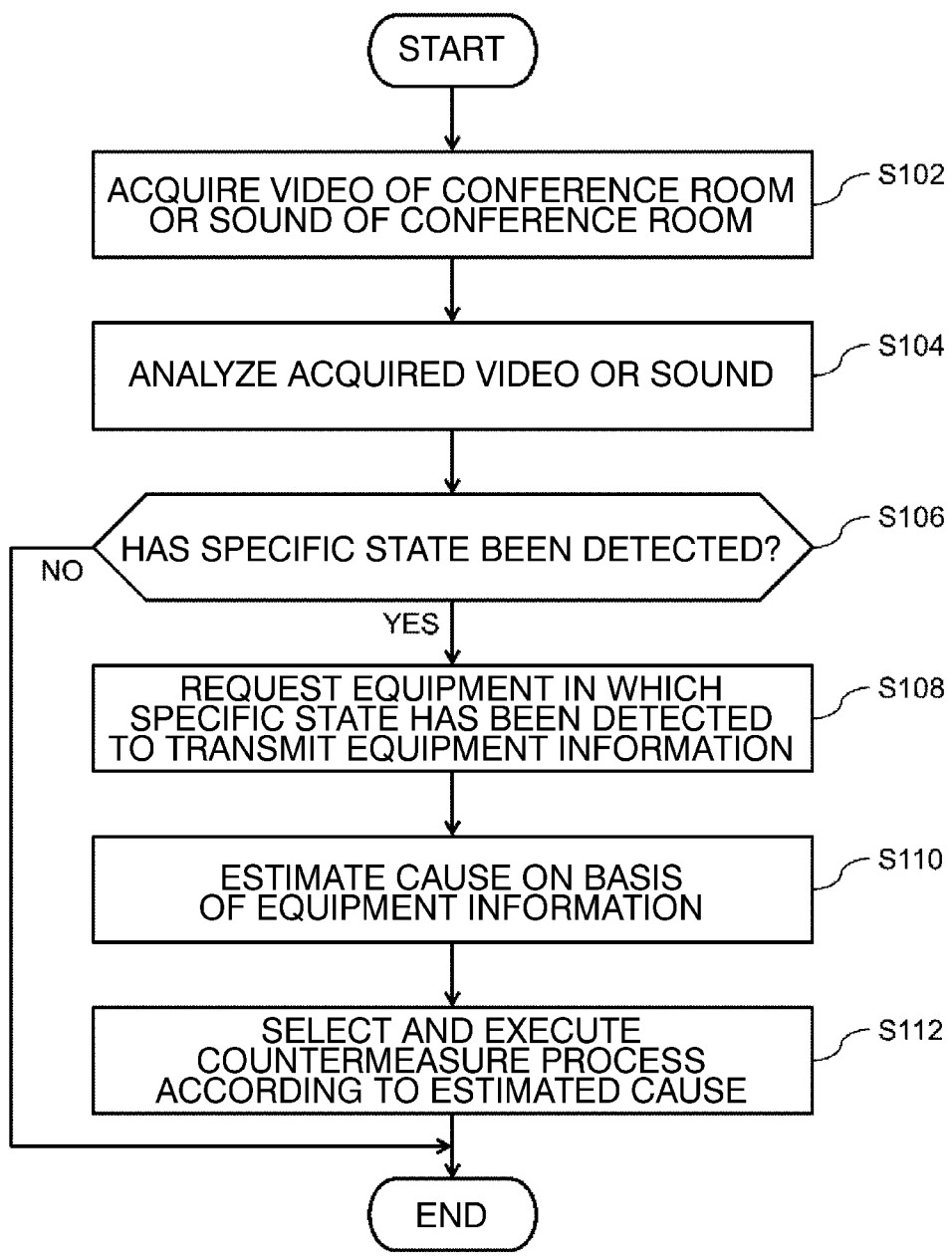
FIG. 3 is a flowchart illustrating a flow of a process executed by the equipment management device.

Hereinafter, a flow of a process of the equipment management device 10 according to the present invention will be described. FIG. 3 is a flowchart illustrating the flow of the process executed by the equipment management device 10.

First, the information collection unit 110 acquires video data of the conference room or sound data of the conference room (S102). The video data of the conference room is generated by the imaging device 30 provided in the conference room. Also, the sound data of the conference room is generated by the microphone 40 provided in the conference room. The information collection unit 110 is connected to the imaging device 30 or the microphone 40 via a network. The information collection unit 110 acquires the video data of the conference room from the imaging device 30 and acquires the sound data of the conference room from the microphone 40.

The specific state detection unit 120 analyzes a video of the conference room or a sound of the conference room acquired in the processing of S102 and determines whether or not a specific state has occurred on the basis of an analysis result (S104 and S106). For example, the specific state detection unit 120 can detect that the specific state has occurred in the output of the video equipment using a machine learning model constructed to output a determination result of whether or not the specific state has occurred using video data as an input. For example, when the equipment 20 is video equipment, the specific state detection unit 120 determines that the specific state has occurred when the fact that there is no output from the video equipment even though a prescribed period of time (for example, from several minutes to several tens of minutes) has elapsed from the start time of the conference is detected from a video. Here, the start time of the conference is acquired, for example, by linking with a conference reservation system (not shown). Also, the specific state detection unit 120 determines that the specific state has occurred when the fact that there is no output from the video equipment is detected from a video even though a prescribed period of time (for example, from several minutes to several tens of minutes) has elapsed after a connection between a terminal (a notebook PC, a tablet terminal, or the like) brought into the conference room and the video equipment was detected from a video. Also, a method in which the specific state detection unit 120 detects a specific state from a video of the conference room is not limited to the example given here. As another example, the specific state detection unit 120 can detect that the specific state has occurred with respect to the equipment 20 by detecting a prescribed keyword(s) (for example, "not shown," "no sound," "something is irritating my eyes" "dark," "hot," "cold," or the like) from which the occurrence of the above-described "specific state" can be predicted from sound data. In this case, the specific state detection unit 120 converts the sound data generated by the microphone 40 into text data using known sound recognition technology and determines whether or not the text data includes a prescribed keyword. The method in which the specific state detection unit 120 detects a specific state from the sound of the conference room is not limited to the example given here.

When no specific state has been detected (S106: NO), the process to be described below is not executed. In this case, the equipment management device 10 continues to monitor the equipment 20 using a video or a sound continuously acquired from the imaging device 30 or the microphone 40.

On the other hand, when a specific state has been detected (S106: YES), the cause estimation unit 130 requests the equipment 20 in which the specific state has been detected to transmit equipment information about the equipment 20 (S108). The cause estimation unit 130 estimates a cause of the specific state on the basis of equipment information of the equipment 20 acquired as a response to the request of S108 (S110). A detailed process of the cause estimation unit 130 will be described in a specific example to be described below.

The countermeasure process execution unit 140 selects and executes a countermeasure process according to the cause estimated by the cause estimation unit 130 (S112). The countermeasure process execution unit 140 can select a countermeasure method according to the estimated cause with reference to, for example, a table as shown in FIG. 12. FIG. 12 is a diagram showing an example of a table referred to when the countermeasure process execution unit 140 identifies a countermeasure process to be executed. The table illustrated in FIG. 12 stores content of a specific state (trouble) assumed for each type of equipment provided in the conference room. Also, the table stores the estimated cause and information about the countermeasure process for the cause in association for content of the specific state (trouble). The countermeasure process execution unit 140 can identify the countermeasure process (the countermeasure process to be executed) corresponding to a result of estimating the cause of the trouble in the cause estimation unit 130 using the table as illustrated in FIG. 12.

As described above, in the present embodiment, when it is determined that the equipment installed in the conference room is in a specific state (such as a state in which there is no output if the equipment is video equipment) from a video or a sound of the conference room, the equipment management device 10 estimates the cause of a specific state on the basis of the equipment information of the equipment and executes the process of eliminating the cause. That is, when some trouble has occurred in the equipment provided in the conference room, the equipment management device 10 automatically estimates and eliminates the cause of the trouble. Thereby, the effect of shortening a period of time required for the work to eliminate the trouble related to the equipment provided in the conference room can be expected.

Hereinafter, the configuration of the system using the equipment management device 10 according to the present invention will be described with some specific examples.

First Specific Example

<<Example of System Configuration>>

Figure 4:
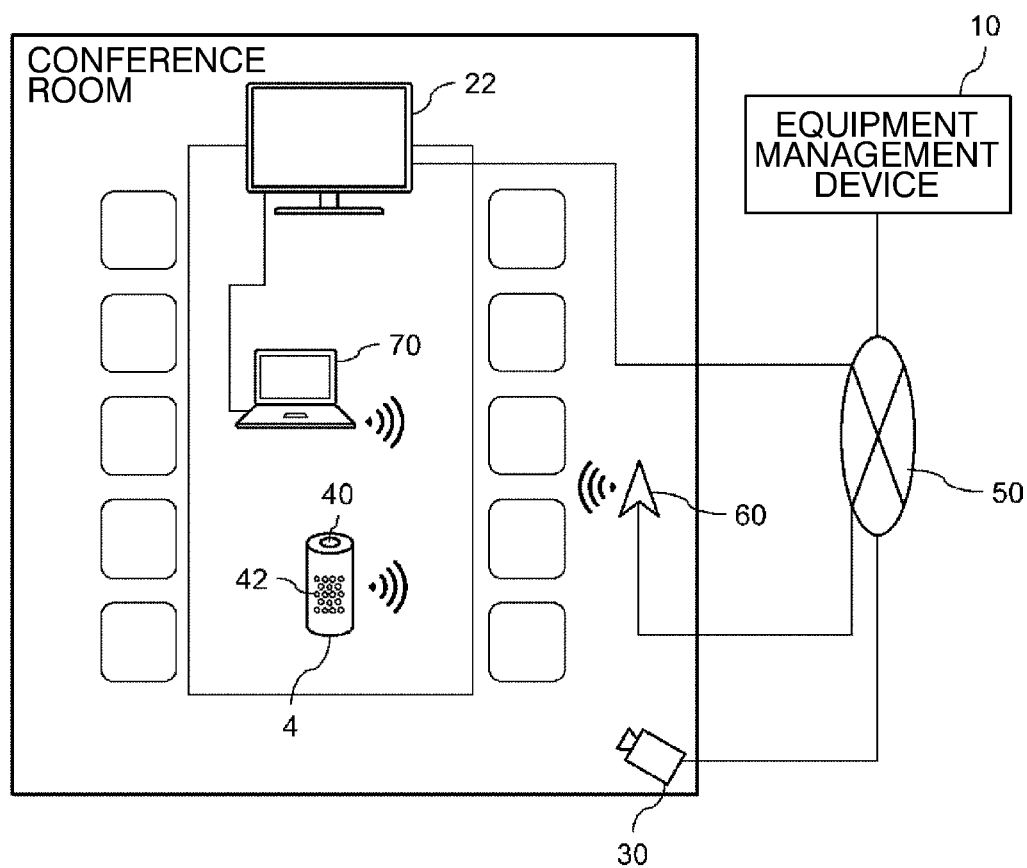
FIG. 4 is a diagram showing an example of a system configuration using the equipment management device according to the present invention.

FIG. 4 is a diagram showing an example of a system configuration using the equipment management device 10 according to the present invention. In the example of FIG. 4, video equipment 22 (a type of equipment 20), an imaging device 30, and a smart speaker 4 having a microphone 40 and a speaker 42 are installed in a conference room. The equipment management device 10 is connected to the video equipment 22, the imaging device 30, and the smart speaker 4 via the LAN 50. Also, in the example of FIG. 4, a wireless LAN access point 60 is provided in the conference room. The video equipment 22, the imaging device 30, and the smart speaker 4 may be connected to the LAN 50 via a wired LAN port (not shown) or may be connected to the LAN 50 via the access point 60.

In the example of FIG. 4, the equipment management device 10 has a function of managing other equipment (for example, lighting equipment and heating equipment (not shown)) within the conference room in addition to the above-described function processing unit. The equipment management device 10 is connected to each type of equipment (for example, the video equipment 22, the imaging device 30, the smart speaker 4, or the like) within the conference room via the LAN 50. The equipment management device 10 can acquire equipment information of the video equipment 22, a video generated by the imaging device 30, sound data collected by the smart speaker 4, and the like via the LAN 50.

In the example of FIG. 4, the video equipment 22 is a monitor. In the example of FIG. 4, the video equipment 22 may be a device (for example, a projector or the like) other than the monitor. The video equipment 22 outputs a video or a sound and a video on the basis of an input signal input from the terminal 70. The video equipment 22 is connected to the LAN 50 by wire. When the video equipment 22 is equipped with a wireless LAN module, the video equipment 22 may be connected to the LAN 50 via the access point 60. When the video equipment 22 is installed in the conference room, information for identifying the equipment 20 (for example, a product serial number unique to the video equipment 22 or an arbitrarily assigned unique identification number) is registered in advance in the equipment management device 10 together with information indicating a location of the conference room. Thereby, in the equipment management device 10, the video equipment 22 and the conference room are associated. The video equipment 22 transmits information (equipment information) indicating the state of the hardware or software of the equipment to the equipment management device 10 in response to a request from the equipment management device 10 connected via the LAN 50.

The terminal 70 stores data to be displayed on the video equipment 22 and is connected to the video equipment 22 through a video cable. When the terminal 70 is equipped with a wireless LAN module, the terminal 70 may communicate with the video equipment 22 via the access point 60 and the LAN 50. Also, the terminal 70 can communicate with an external device (not shown) via the LAN 50, acquire display data stored in the external device, and output the acquired display data to the video equipment 22.

The imaging device 30 is provided at a position where the conference room can be photographed as a whole to monitor an output state of the video equipment 22 installed in the conference room. For example, the imaging device 30 is an omnidirectional camera configured to be able to perform photography in all directions. Also, the imaging device 30 may be a pan-tilt-zoom (PTZ) camera having a PTZ function. In the example of FIG. 4, the imaging device 30 is connected to the LAN 50 by wire. When the imaging device 30 is equipped with a wireless LAN module, the imaging device 30 may be connected to the LAN 50 via the access point 60. When the imaging device 30 is installed in a conference room, information for identifying the imaging device 30 (for example, a product serial number unique to the imaging device 30 or an arbitrarily assigned unique identification number) is registered in advance in the equipment management device 10 together with information indicating the location of the conference room. Thereby, in the equipment management device 10, the imaging device 30 and the conference room are associated. The imaging device 30 transmits a generated video to the equipment management device 10 connected via the LAN 50. Also, a configuration in which a video analysis result of the processor (for example, whether or not a specific state has been detected) is transmitted to the equipment management device 10 when the imaging device 30 is a so-called intelligent camera equipped with a processor for image processing may be adopted.

The smart speaker 4 is provided to monitor an output state of the video equipment 22 installed in the conference room. Also, as will be described below, the smart speaker 4 interacts with the user of the conference room using a sound message and supports the work to eliminate the trouble related to the output of the video equipment 22. The smart speaker 4 includes the microphone 40 for collecting a sound in the conference room and the speaker 42 for outputting a sound message. In the example of FIG. 4, the smart speaker 4 is connected to the LAN 50 via the access point 60. The smart speaker 4 may be connected to the LAN 50 by wire. When the smart speaker 4 is installed in the conference room, information for identifying the smart speaker 4 (for example, a product serial number unique to the smart speaker 4 or an arbitrarily assigned unique identification number) is registered in advance in the equipment management device 10 together with information indicating the location of the conference room. Thereby, the smart speaker 4 and the conference room are associated in the equipment management device 10.

<<Flow of Process of Eliminating Specific State>>

Hereinafter, a flow in which the equipment management device 10 eliminates a specific state (trouble) when the specific state has been detected with respect to the output of the video equipment 22 will be described.

Figure 5:
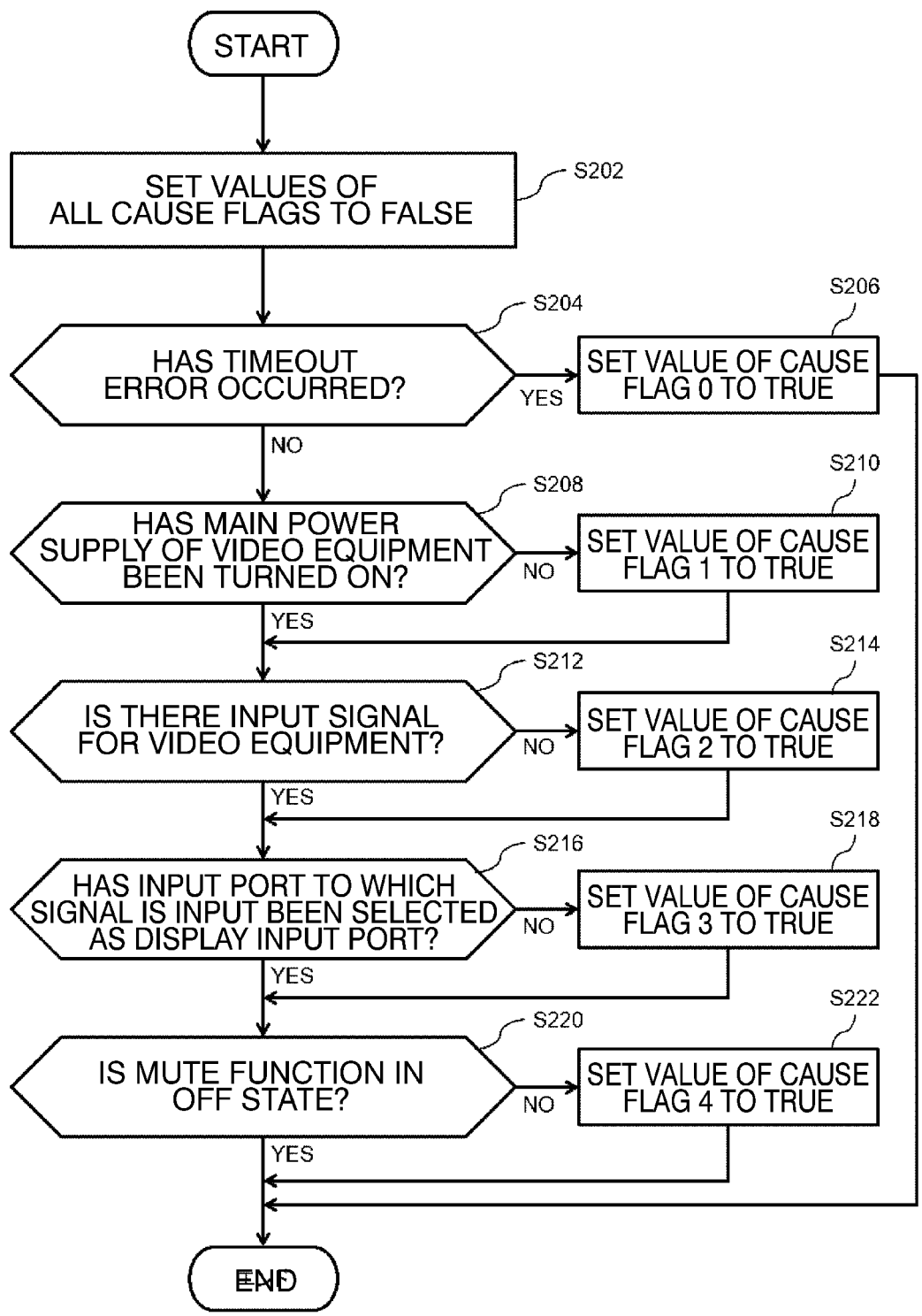
FIG. 5 is a flowchart showing an example of a detailed flow of the processing of S110 in FIG. 3.

FIG. 5 is a flowchart showing an example of a detailed flow of the processing of S110 in FIG. 3.

First, the cause estimation unit 130 sets values of all cause flags to "false" and initializes each flag value (S202). The cause flag is provided for each cause of the trouble related to the output of the video equipment 22, for example, in the program module of the cause estimation unit 130. As will be described below, the cause estimation unit 130 can determine which cause has been estimated by setting the value of the cause flag corresponding to the estimated cause of the trouble related to the output of the video equipment 22 to "true."

After the values of all the cause flags are initialized, the cause estimation unit 130 determines whether or not a timeout error has occurred on the basis of the equipment information acquired as a response to the request transmitted in the processing of S108 (S204). For example, when the video equipment 22 cannot be normally connected to the LAN 50, the request transmitted from the equipment management device 10 (the cause estimation unit 130) does not reach the video equipment 22 and a timeout error occurs after the elapse of a certain period of time. In this case, the cause estimation unit 130 acquires information indicating the timeout error (information indicating a network connection state of the video equipment 22) as the equipment information. Consequently, when the timeout error has occurred and equipment information indicating the timeout error has been acquired (S204: YES), the cause estimation unit 130 sets a value of a cause flag (referred to as "cause flag 0" in FIG. 5) corresponding to the cause of a "LAN connection abnormality" to "true" (S206). Also, in this case, because communication with the video equipment 22 is impossible and equipment information indicating another state cannot be obtained from the video equipment 22, a process of estimating the cause of the specific state ends. On the other hand, when the equipment information indicating the timeout error has not been acquired (S204: NO), the cause estimation unit 130 maintains the value of cause flag 0 as "false" and performs the next determination process.

Subsequently, the cause estimation unit 130 determines whether or not the main power supply of the video equipment 22 has been turned on on the basis of the equipment information acquired from the video equipment 22 (S208). The cause estimation unit 130 can identify information indicating a state of the main power supply of the video equipment 22 from the acquired equipment information and determine whether or not the main power supply of the video equipment 22 is turned on on the basis of the identified information. When the equipment information indicating that the main power supply of the video equipment has not been turned on has been acquired (S208: NO), the cause estimation unit 130 sets the value of the cause flag (referred to as "cause flag 1" in FIG. 5) corresponding to the cause of "turn-off of main power supply" to "true" (S210). On the other hand, when the equipment information indicating that the main power supply of the video equipment has been turned on has been acquired (S208: YES), the cause estimation unit 130 maintains the value of cause flag 1 as "false" and performs the next determination process.

Subsequently, the cause estimation unit 130 determines whether or not there is an input signal for the video equipment 22 on the basis of the equipment information acquired from the video equipment 22 (S212). The cause estimation unit 130 can identify information indicating the presence or absence of an input signal from the acquired equipment information and determine whether or not there is an input signal for the video equipment 22 on the basis of the identified information. When the equipment information indicating that there is no input signal for the video equipment 22 is acquired (S212: NO), the cause estimation unit 130 sets a value of a cause flag (referred to as "cause flag 2" in FIG. 5) corresponding to the cause of "no input signal" to "true" (S214). On the other hand, when the equipment information indicating that there is an input signal for the video equipment 22 is acquired (S212: YES), the cause estimation unit 130 maintains the value of cause flag 2 as "false" and performs the next determination process.

Subsequently, the cause estimation unit 130 determines whether the input port receiving the signal output from the terminal 70 has been selected as the display input port in the video equipment 22 on the basis of the equipment information acquired from the video equipment 22 (S216). When the video equipment 22 has a plurality of input ports (for example, a high-definition multimedia interface (HDMI) (registered trademark) port, a digital visual interface (DVI) port, a DisplayPort port, or the like), no video or sound will be output if no signal is input to an input port selected as a display input port. The cause estimation unit 130 identifies an input port to which a signal from the terminal 70 is input and a display input port currently selected on the basis of the acquired equipment information and determines whether or not the identified input ports are the same. When equipment information indicating that the input port to which the signal from the terminal 70 is input and the input port selected as the display input port are different has been acquired (S216: NO), the cause estimation unit 130 sets a value of a cause flag (referred to as "cause flag 3" in FIG. 5) corresponding to a cause of an "input port selection error" to "true" (S218). On the other hand, when the equipment information indicating that the input port to which the signal from the terminal 70 is input and the input port selected as the display input port match has been acquired (S216: YES), the cause estimation unit 130 performs the next determination process while maintaining the value of cause flag 3 as "false."

Subsequently, the cause estimation unit 130 confirms whether a video or sound mute function is in an OFF state in the video equipment 22 on the basis of the equipment information acquired from the video equipment 22 (S220). The cause estimation unit 130 can identify information indicating a state of a mute function of the video equipment 22 from the acquired equipment information and determine whether the mute function is an ON state or the OFF state on the basis of the information. When the equipment information indicating that the mute function is in the ON state in the video equipment 22 has been acquired (S220: NO), the cause estimation unit 130 sets a value of a cause flag (referred to as "cause flag 4" in FIG. 5) corresponding to the cause of "forgetting to turn off the mute function" to "true" (S222). On the other hand, when the equipment information indicating that the mute function is in the OFF state in the video equipment 22 has been acquired (S220: YES), the cause estimation unit 130 maintains the value of cause flag 4 as "false." Subsequently, a process for the estimated cause (a cause flag for which the value of "true" is set) is executed.

Figure 6:
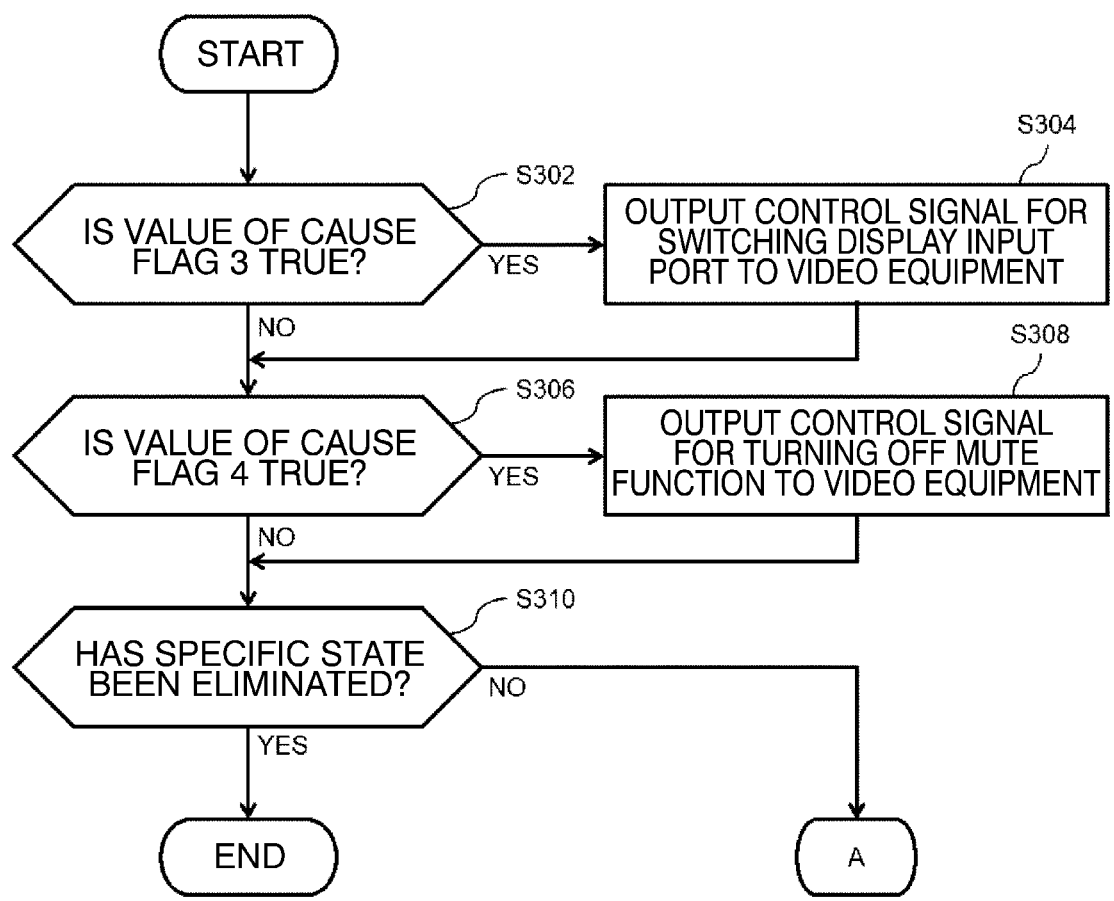
FIG. 6 is a flowchart illustrating a flow in which a countermeasure process execution unit automatically eliminates troubles related to an output of video equipment.

In the flowchart of FIG. 5, "cause flag 3" and "cause flag 4" are causes related to the software setting of the video equipment 22. Thus, the equipment management device 10 can eliminate the trouble related to the output of the video equipment 22 by generating a control signal for switching the software setting of the video equipment 22 to an appropriate setting and transmitting the control signal to the video equipment 22. The flow of this process will be described below. FIG. 6 is a flowchart illustrating a flow in which the countermeasure process execution unit 140 automatically eliminates troubles related to the output of the video equipment 22.

The countermeasure process execution unit 140 determines whether or not the value of cause flag 3 is "true" (S302). When the value of cause flag 3 is "true," an input port different from the input port to which the signal has been input is selected as the display input port in the video equipment 22. Consequently, when the value of cause flag 3 is "true" (S302: YES), the countermeasure process execution unit 140 generates a control signal for switching the display input port to the input port to which the signal is input and outputs the control signal to the video equipment 22 (S304). When the video equipment 22 receives the control signal generated by the processing of S304, the video equipment 22 switches the display input port on the basis of the control signal. Thereby, the input port to which the signal is input is selected as the display input port. When the value of cause flag 3 is "false" (S302: NO), the countermeasure process execution unit 140 does not execute the processing of S304.

Also, the countermeasure process execution unit 140 determines whether or not the value of cause flag 4 is "true" (S306). When the value of cause flag 4 is "true," the video or sound mute function is in the ON state in the video equipment 22. Consequently, when the value of cause flag 4 is "true" (S306: YES), the countermeasure process execution unit 140 generates a control signal for setting a state of the mute function to the OFF state in the video equipment 22 and outputs the control signal to the video equipment 22 (S308). When the control signal generated in the processing of S308 is received, the video equipment 22 sets the state of the mute function to the OFF state on the basis of the control signal. Thereby, the video and sound that have been blocked in the mute function will be output from the video equipment 22.

Subsequently, the countermeasure process execution unit 140 determines whether or not the specific state has been eliminated (S310). The countermeasure process execution unit 140 can determine that the specific state has been eliminated, for example, when a result of analyzing a video acquired from the imaging device 30 indicates that an output of a video can be detected from the video equipment 22 or when a result of analyzing a sound acquired from the smart speaker 4 indicates that a prescribed keyword (such as "repaired" or "(a video or sound) output") can be detected. Also, for example, the countermeasure process execution unit 140 can determine whether or not there is a cause flag in which the value of "true" is set among other cause flags (specifically, cause flags 0 to 2) and determine that the specific state has not been eliminated when there is a corresponding cause flag. When the specific state has not been eliminated (S310: NO), the countermeasure process execution unit 140 further executes the process as described below. On the other hand, when the specific state has been eliminated (S310: YES), the process as described below is not executed.

As described above, when the cause of the trouble related to the video equipment 22 (equipment provided in the conference room) is the cause related to the software setting of the video equipment 22, the equipment management device 10 according to the present invention automatically executes a process of eliminating the cause. Thereby, it is possible to reduce the work in which a person in the conference room has to eliminate the trouble.

Figure 7:
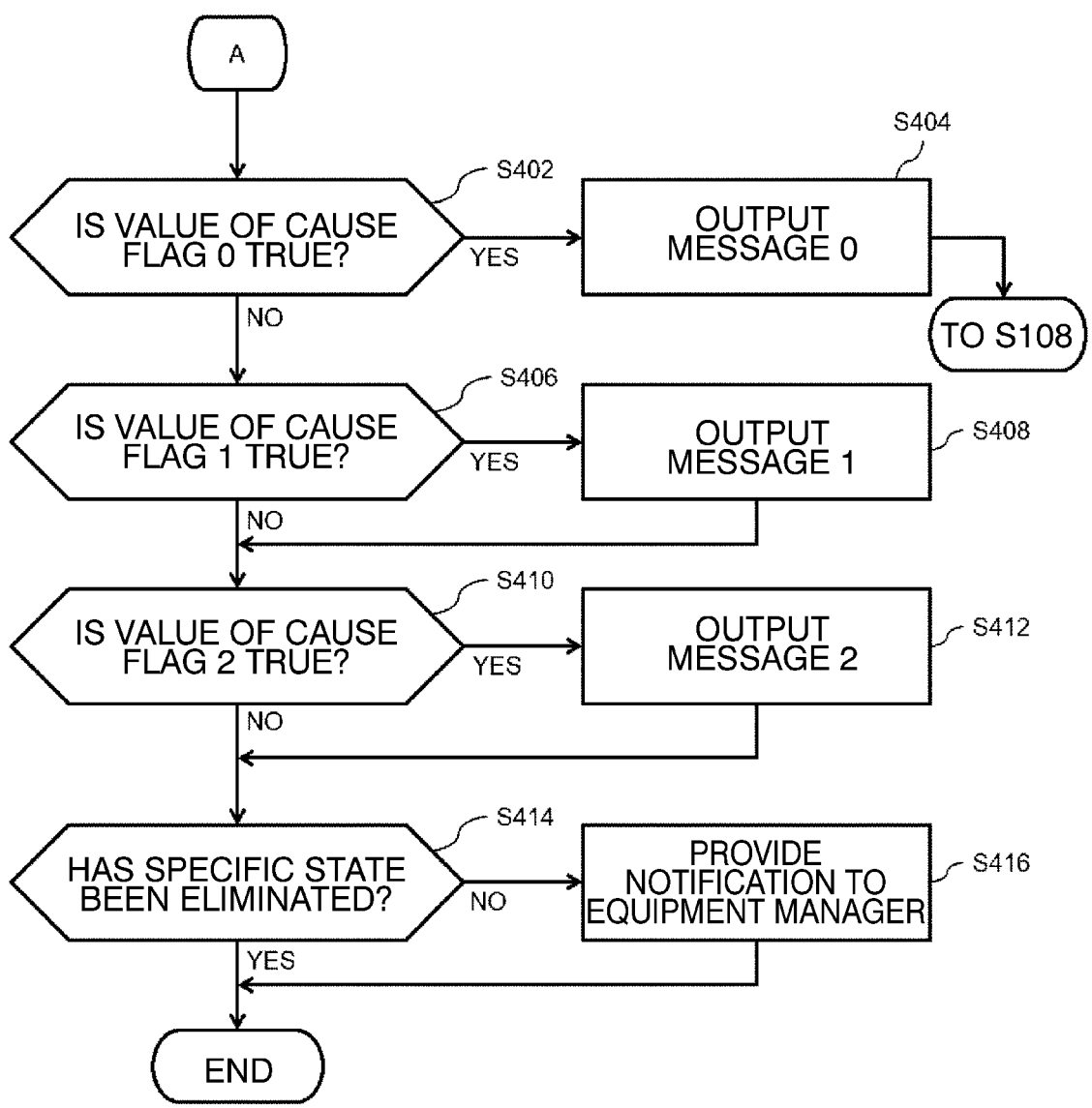
FIG. 7 is a flowchart illustrating a flow in which the countermeasure process execution unit supports manual trouble-shooting work by outputting a message to a person within a conference room.

In the flowchart of FIG. 5, cause flags from "cause flag 0" to "cause flag 2" are causes related to hardware settings that are not related to software settings of the video equipment 22. Thus, when these causes have been estimated, it is necessary for the person in the conference room to correct a hardware setting error. Therefore, the countermeasure process execution unit 140 outputs a message for providing a notification of a point or the like to be checked to eliminate the estimated cause using the smart speaker 4 and supports a person who actually eliminates the trouble in the conference room. FIG. 7 is a flowchart illustrating a flow in which the countermeasure process execution unit 140 supports manual trouble-shooting work by outputting a message to a person within the conference room.

First, the countermeasure process execution unit 140 determines whether or not the value of cause flag 0 is "true" (S402). When the value of cause flag 0 is "true," it indicates that the video equipment 22 is not correctly connected to the LAN 50 and the equipment information cannot be acquired from the video equipment 22. Because equipment information is required to identify the cause of the trouble related to the output of the video equipment 22, when the value of cause flag 0 is "true" (S402: YES), the countermeasure process execution unit 140 reads data of a message for prompting a person to confirm a LAN connection state of the video equipment 22 (referred to as "message 0" in FIG. 7) and outputs message 0 via the smart speaker 4 (S404). Message 0 is, for example, "Please confirm that the video equipment is properly connected to the network. Is it okay . . . ?". Such data of message 0 is stored in advance in a storage area of the equipment management device 10 such as the memory 1030 or the storage device 1040. When it is confirmed that the person in the conference room has correctly connected the video equipment 22 to the LAN 50, the equipment management device 10 outputs a request for transmitting equipment information to the video equipment 22 again and acquires the equipment information from the video equipment 22 (S108 in FIG. 3). Subsequently, the process of estimating a cause on the basis of the equipment information acquired from the video equipment 22 as described with reference to FIG. 5 is executed again.

On the other hand, when a value of cause flag 0 is "false" (S402: NO), the equipment management device 10 can acquire the equipment information from the video equipment 22 because the video equipment 22 is correctly connected to the LAN 50. In this case, a determination process related to cause flags 1 and 2 is executed in the flowchart of FIG. 5. Therefore, the countermeasure process execution unit 140 determines whether or not the value of cause flag 1 is "true" (S406). When the value of cause flag 1 is "true," it indicates that a main power supply of the video equipment 22 is turned off. When the value of cause flag 1 is "true" (S406: YES), the countermeasure process execution unit 140 reads data of a message for prompting a person to confirm the ON/OFF state of the main power supply of the video equipment 22 (referred to as "message 1" in FIG. 7) and outputs message 1 via the smart speaker 4 (S408). Message 1 is, for example, "Is the power supply of the video equipment turned on?", "Please turn on the power supply of the video equipment. Is it okay . . . ?", or the like. Such data of message 1 is stored in advance in a storage area of the equipment management device 10, such as the memory 1030 or the storage device 1040.

The countermeasure process execution unit 140 determines whether or not the value of cause flag 2 is "true" when the value of cause flag 1 is "false" (S406: NO) or when a person within the conference room has made a positive response to message 1 from a sound picked up by the smart speaker 4 (S410). When the value of cause flag 2 is "true," it indicates that there is no input signal for the video equipment 22. When the value of cause flag 2 is "true" (S410: YES), the countermeasure process execution unit 140 reads data of a message for prompting a person to confirm a path of an input signal for the video equipment 22 (referred to as "message 2" in FIG. 7) and outputs message 2 via the smart speaker 4 (S412). Message 2 is, for example, "The input signal cannot be detected by the video equipment. Is the cable connected correctly?", "Please connect your terminal and the video equipment with a cable. Is it okay . . . ?", or the like. Such data of message 2 is stored in advance in a storage area of the equipment management device 10, for example, such as the memory 1030 or the storage device 1040.

When the value of cause flag 2 is "false" (S410: NO) or when it is detected that the person within the conference room has made the positive response to message 2 from a sound picked up by the smart speaker 4, the countermeasure process execution unit 140 determines whether or not the specific state has been eliminated (S414). The countermeasure process execution unit 140 can determine that the specific state has been eliminated, for example, when a result of analyzing a video acquired from the imaging device 30 indicates that an output of the video from the video equipment 22 can be detected or when a result of analyzing a sound acquired from the smart speaker 4 indicates that a prescribed keyword (such as "repaired" or "(a video or sound) output") can be detected. Here, when the specific state has been eliminated (S414: YES), the countermeasure process execution unit 140 ends the process. On the other hand, when the specific state has not been eliminated (S414: NO), the countermeasure process execution unit 140 notifies a terminal of a person in charge (an equipment manager) who manages various types of equipment installed in the conference room that the trouble of the video equipment 22 has occurred (S416). Thereby, if the trouble of the video equipment 22 (equipment provided in the conference room) cannot be eliminated and remains, it is possible to call the equipment manager who is familiar with equipment including the video equipment 22 and try to eliminate the trouble at an early stage.

As described above, as illustrated in FIG. 7, when a cause related to a hardware state of the video equipment 22 (equipment provided in the conference room) has been estimated, an interactive message is output using the smart speaker 4. Thereby, the person in the conference room is estimated to smoothly perform the work for eliminating the trouble caused by the hardware state of the video equipment 22.

Second Specific Example

<<Example of System Configuration>>

Figure 8:
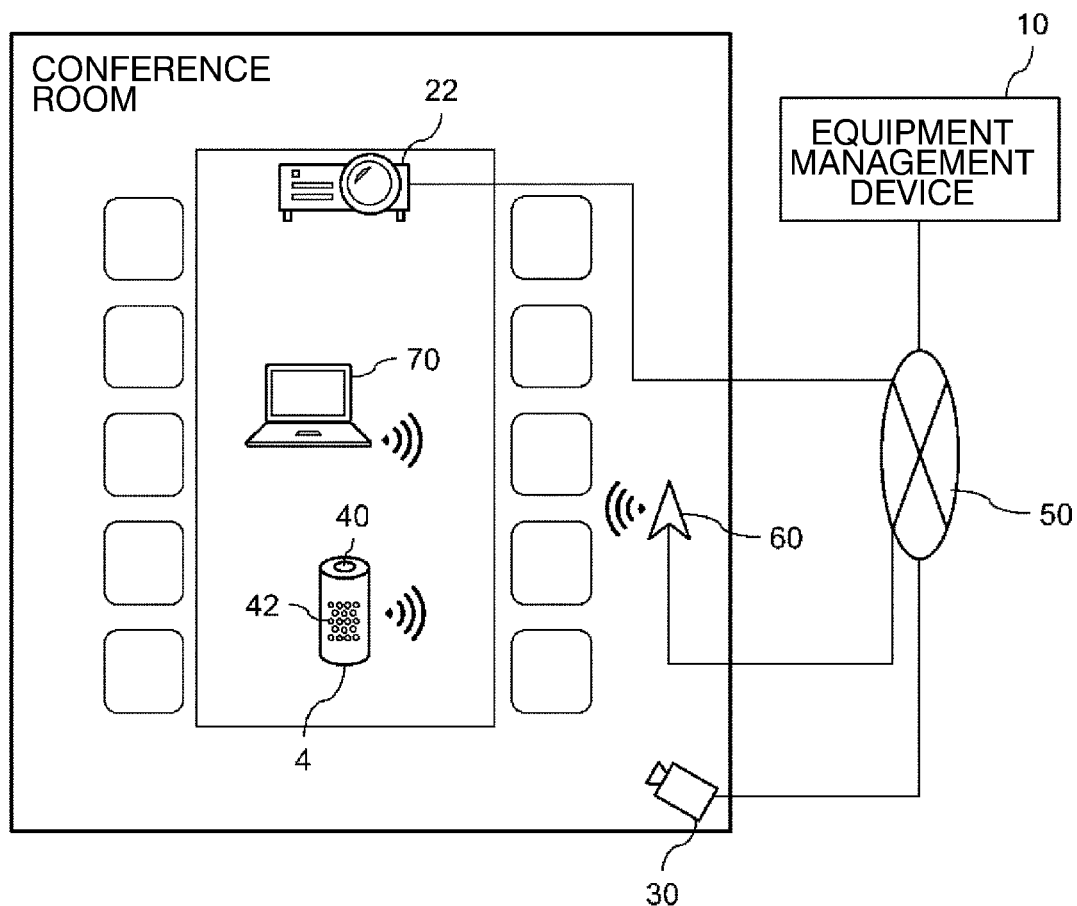
FIG. 8 is a diagram showing an example of a system configuration using the equipment management device according to the present invention.

FIG. 8 is a diagram showing an example of a system configuration using the equipment management device 10 according to the present invention. In the example of FIG. 8, in the conference room, the video equipment 22 (a type of equipment 20), the imaging device 30, and the smart speaker 4 having the microphone 40 and the speaker 42 are installed. The equipment management device 10 is connected to the video equipment 22, the imaging device 30, and the smart speaker 4 via the LAN 50. Also, in the example of FIG. 8, the conference room includes the wireless LAN access point 60. The video equipment 22, the imaging device 30, and the smart speaker 4 may be connected to the LAN 50 via a wired LAN port (not shown) or may be connected to the LAN 50 via the access point 60.

In the example of FIG. 8, the video equipment 22 is a projector. Also, the video equipment 22 may be a device other than the projector (for example, a monitor or the like). The video equipment 22 outputs a video or a sound and a video on the basis of an input signal input from the terminal 70. The video equipment 22 is connected to the LAN 50 by wire. When the video equipment 22 is equipped with a wireless LAN module, the video equipment 22 may be connected to the LAN 50 via the access point 60. When the video equipment 22 is installed in the conference room, information for identifying the video equipment 22 (for example, a product serial number unique to the video equipment 22, an arbitrarily assigned unique identification number, or the like) is registered in advance in the equipment management device 10 together with information indicating a location of the conference room. Thereby, in the equipment management device 10, the video equipment 22 and the conference room are associated. The video equipment 22 transmits information (equipment information) indicating a state of hardware or software of the equipment to the equipment management device 10 in response to a request from the equipment management device 10 connected via the LAN 50.

The terminal 70 stores data to be displayed on the video equipment 22 and is connected to the video equipment 22 on the LAN 50 via the access point 60. In the example of FIG. 8, an image transmission application is installed in the terminal 70 and the terminal 70 attempts to communicate with the video equipment 22 via the image transmission application. When the terminal 70 activates the image transmission application, the terminal 70 notifies the equipment management device 10 of information indicating the activation of the image transmission application via the access point 60. Also, the terminal 70 can communicate with an external device (not shown) via the LAN 50 to acquire display data stored in the external device and output the acquired display data to the video equipment 22.

The imaging device 30 is provided at a position where the conference room can be photographed as a whole so that an output state of the video equipment 22 installed in the conference room is monitored. For example, the imaging device 30 is an omnidirectional camera that is configured so that photography can be performed in all directions. Also, the imaging device 30 may be a pan-tilt-zoom (PTZ) camera having a PTZ function. In the example of FIG. 8, the imaging device 30 is connected to the LAN 50 by wire. When the imaging device 30 is equipped with a wireless LAN module, the imaging device 30 may be connected to the LAN 50 via the access point 60. When the imaging device 30 is installed in the conference room, information for identifying the imaging device 30 (for example, a product serial number unique to the imaging device 30, an arbitrarily assigned unique identification number, or the like) is registered in advance in the equipment management device 10 together with information indicating the location of the conference room. Thereby, in the equipment management device 10, the imaging device 30 and the conference room are associated. The imaging device 30 transmits a generated video to the equipment management device 10 connected via the LAN 50. Also, a configuration in which a result of analyzing the video using the processor (for example, whether or not a specific state has been detected) is transmitted to the equipment management device 10 when the imaging device 30 is a so-called intelligent camera equipped with a processor for image processing may be adopted.

The smart speaker 4 is provided to monitor an output state of the video equipment 22 installed in the conference room. Also, as will be described below, the smart speaker 4 interacts with a user of the conference room using a sound message and supports the work for eliminating the trouble related to the output of the video equipment 22. The smart speaker 4 includes the microphone 40 for collecting a sound in a conference room and the speaker 42 for outputting a sound message. In the example of FIG. 8, the smart speaker 4 is connected to the LAN 50 via the access point 60. The smart speaker 4 may be connected to the LAN 50 by wire. When the smart speaker 4 is installed in the conference room, information for identifying the smart speaker 4 (for example, a product serial number unique to the smart speaker 4, an arbitrarily assigned unique identification number, or the like) is registered in advance in the equipment management device 10 together with information indicating a location of the conference room. Thereby, in the equipment management device 10, the smart speaker 4 and the conference room are associated.

<<Flow of Process of Eliminating Specific State>>

Hereinafter, a flow in which the equipment management device 10 eliminates a specific state (trouble) when the specific state has been detected with respect to the output of the video equipment 22 will be described.

Figure 9:
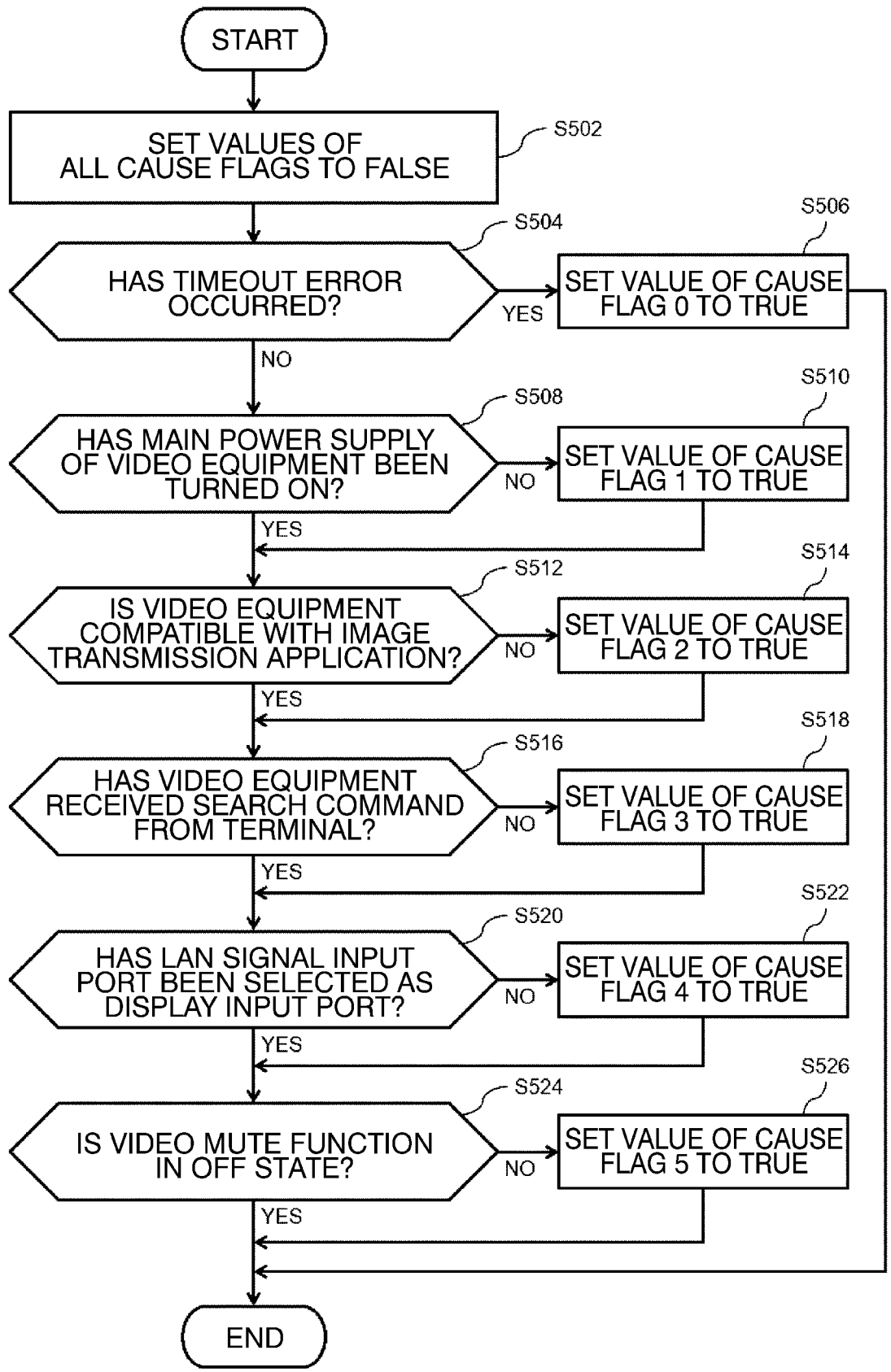
FIG. 9 is a flowchart showing an example of a detailed flow of the processing of S110 of FIG. 3.

FIG. 9 is a flowchart showing an example of a detailed flow of the processing of S110 in FIG. 3.

First, the cause estimation unit 130 sets values of all cause flags to "false" and initializes each flag value (S502). This processing is similar to the processing of S202 of FIG. 5.

After the values of all the cause flags are initialized, the cause estimation unit 130 determines whether or not a timeout error has occurred on the basis of equipment information acquired as a response to a request transmitted in the processing of S108 (S504). When the equipment information indicating the timeout error has been acquired (S504: YES), the cause estimation unit 130 sets a value of a cause flag (referred to as "cause flag 0" in FIG. 9) corresponding to the cause of a "LAN connection abnormality" to "true" (S506). On the other hand, when the equipment information indicating the timeout error has not been acquired (S504: NO), the cause estimation unit 130 maintains the value of cause flag 0 as "false" and performs the next determination process. These types of processing are similar to the processing of S204 and S206 of FIG. 5.

Subsequently, the cause estimation unit 130 determines whether or not the main power supply of the equipment 20 has been turned on on the basis of the equipment information acquired from the video equipment 22 (S508). When the equipment information indicating that the main power supply of the video equipment has been turned off has been acquired (S208: NO), the cause estimation unit 130 sets a value of a cause flag (referred to as "cause flag 1" in FIG. 9) corresponding to the cause of "OFF state of main power supply" to "true" (S510). On the other hand, when the equipment information indicating that the main power supply of the video equipment has been turned on has been acquired (S508: YES), the cause estimation unit 130 maintains the value of cause flag 1 as "false" and performs the next determination process. These types of processing are similar to the processing of S208 and S210 of FIG. 5.

Subsequently, the cause estimation unit 130 determines whether or not the equipment 20 is compatible with the image transmission application on the basis of the equipment information acquired from the video equipment 22 (S512). The cause estimation unit 130 can identify, for example, information indicating a product number or version of the video equipment 22 from the acquired equipment information, and determine whether or not the video equipment 22 is compatible with the image transmission application on the basis of the identified information. When the equipment information indicating that the video equipment 22 is incompatible with the image transmission application has been acquired (S512: NO), the cause estimation unit 130 sets a value of a cause flag (referred to as "cause flag 2" in FIG. 9) corresponding to the cause of "incompatible application" to "true" (S514). On the other hand, when the equipment information indicating that the video equipment 22 is compatible with the image transmission application has been acquired (S512: YES), the cause estimation unit 130 maintains the value of cause flag 2 as "false" and performs the next determination process.

Subsequently, the cause estimation unit 130 determines whether or not the video equipment 22 has received a search command (a command transmitted via the image transmission application to search for a pairing target) from the terminal 70 on the basis of the equipment information acquired from the video equipment 22 (S516).

When the equipment information indicating that the video equipment 22 has not received the search command from the terminal 70 has been acquired (S516: NO), the cause estimation unit 130 sets a value of a cause flag (referred to as "cause flag 3" in FIG. 9) corresponding to the cause of "unreceived search command" to "true" (S518). On the other hand, when the equipment information indicating that the video equipment 22 has received the search command from the terminal 70 has been acquired (S516: YES), the cause estimation unit 130 maintains the value of cause flag 3 as "false" and performs the next determination process.

Subsequently, the cause estimation unit 130 determines whether the LAN signal input port has been selected as the display input port in the video equipment 22 on the basis of the equipment information acquired from the video equipment 22 (S518). When the equipment information indicating that the input port currently selected as the display input port is not the LAN signal input port has been acquired (S520: NO), the cause estimation unit 130 sets the value of a cause flag (referred to as "cause flag 4" in FIG. 9) corresponding to a cause of "input port selection error" to "true" (S522). On the other hand, when the equipment information indicating that the input port currently selected as the display input port is the LAN signal input port has been acquired (S522: YES), the cause estimation unit 130 maintains the value of cause flag 4 as "false" and performs the next determination process.

Subsequently, the cause estimation unit 130 confirms whether the video or sound mute function is in an OFF state in the equipment 20 on the basis of the equipment information acquired from the video equipment 22 (S220). The cause estimation unit 130 can identify information indicating the state of the mute function of the video equipment 22 from the acquired equipment information and determine whether the mute function is in an ON state or the OFF state on the basis of the information. When the equipment information indicating that the mute function is in the ON state in the video equipment 22 has been acquired (S524: NO), the cause estimation unit 130 sets a value of a cause flag (referred to as "cause flag 5" in FIG. 9) corresponding to the cause of "forgetting to turn off the mute function" to "true" (S526). On the other hand, when the equipment information indicating that the mute function is in the OFF state in the video equipment 22 has been acquired (S524: YES), the cause estimation unit 130 maintains the value of cause flag 5 as "false." Subsequently, a process for the estimated cause (a cause flag for which the value of "true" is set) is executed.

Figure 10:
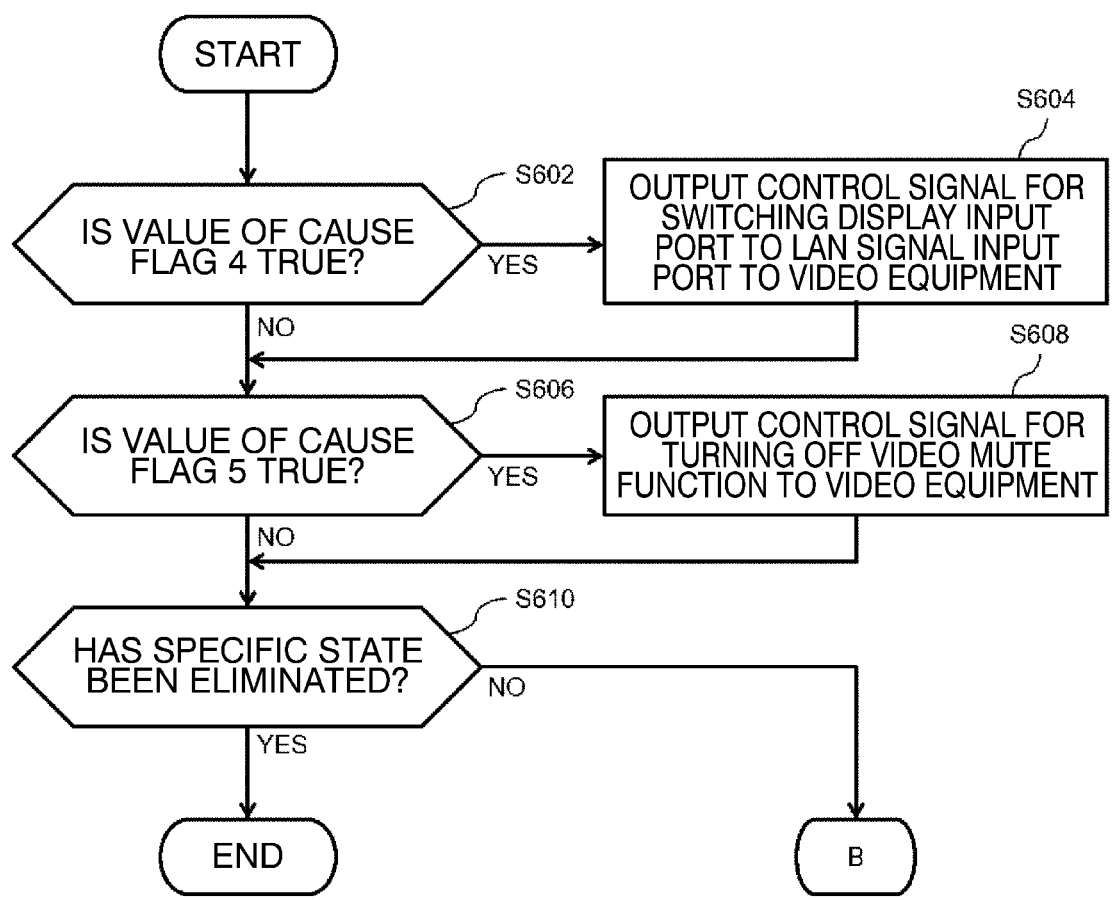
FIG. 10 is a flowchart illustrating a flow in which the countermeasure process execution unit automatically eliminates troubles related to an output of video equipment.

In the flowchart of FIG. 9, "cause flag 4" and "cause flag 5" are causes related to the software setting of the video equipment 22. Thus, the equipment management device 10 can eliminate the trouble related to the output of the video equipment 22 by generating a control signal for switching the software setting of the video equipment 22 to an appropriate setting and transmitting the control signal to the video equipment 22. A flow of this process will be described below. FIG. 10 is a flowchart illustrating a flow in which the countermeasure process execution unit 140 automatically eliminates the trouble related to the output of the equipment 20.

The countermeasure process execution unit 140 determines whether or not the value of cause flag 4 is "true" (S602). When the value of cause flag 4 is "true," the input port other than the LAN signal input port is selected as the display input port in the video equipment 22. Therefore, when the value of cause flag 4 is "true" (S602: YES), the countermeasure process execution unit 140 generates a control signal for switching the display input port to the LAN signal input port and outputs the control signal to the video equipment 22 (S604). When the control signal generated in the processing of S604 is received, the video equipment 22 switches the display input port to the LAN signal input port on the basis of the control signal. Thereby, the input port to which the signal of the terminal 70 is input is selected as the display input port. When the value of cause flag 3 is "false" (S602: NO), the countermeasure process execution unit 140 does not execute the processing of S304.

Also, the countermeasure process execution unit 140 determines whether or not the value of cause flag 5 is "true" (S606). When the value of cause flag 5 is "true," the video or sound mute function is in an ON state in the video equipment 22. Consequently, when the value of cause flag 5 is "true" (S606: YES), the countermeasure process execution unit 140 generates a control signal for setting the mute function to an OFF state in the video equipment 22 and outputs the control signal to the video equipment 22 (S608). When the video equipment 22 receives the control signal generated in the processing of S608, the video equipment 22 sets the mute function to the OFF state on the basis of the control signal. Thereby, a video or a sound that has been blocked according to the mute function will be output from the video equipment 22.

Subsequently, the countermeasure process execution unit 140 determines whether or not the specific state has been eliminated (S610). The countermeasure process execution unit 140 can determine that the specific state has been eliminated, for example, when a result of analyzing a video acquired from the imaging device 30 indicates that an output of a video can be detected from the video equipment 22 or when a result of analyzing a sound acquired from the smart speaker 4 indicates that a prescribed keyword (such as "repaired" or "(a video or sound) output") can be detected. For example, the countermeasure process execution unit 140 can determine whether or not there is a cause flag in which the value of "true" is set among other cause flags (specifically, cause flags 0 to 3) and determine that the specific state has not been eliminated when there is a corresponding cause flag. When the specific state has not been eliminated (S610: NO), the countermeasure process execution unit 140 further executes the process as described below. On the other hand, when the specific state has been eliminated (S610: YES), the process as described below is not executed.

As described above, when the cause of the trouble related to the video equipment 22 (equipment provided in the conference room) is the cause related to the software setting of the video equipment 22, the equipment management device 10 according to the present invention automatically performs a process of eliminating the cause. Thereby, it is possible to reduce the work in which a person in the conference room has to eliminate the trouble.

Figure 11:
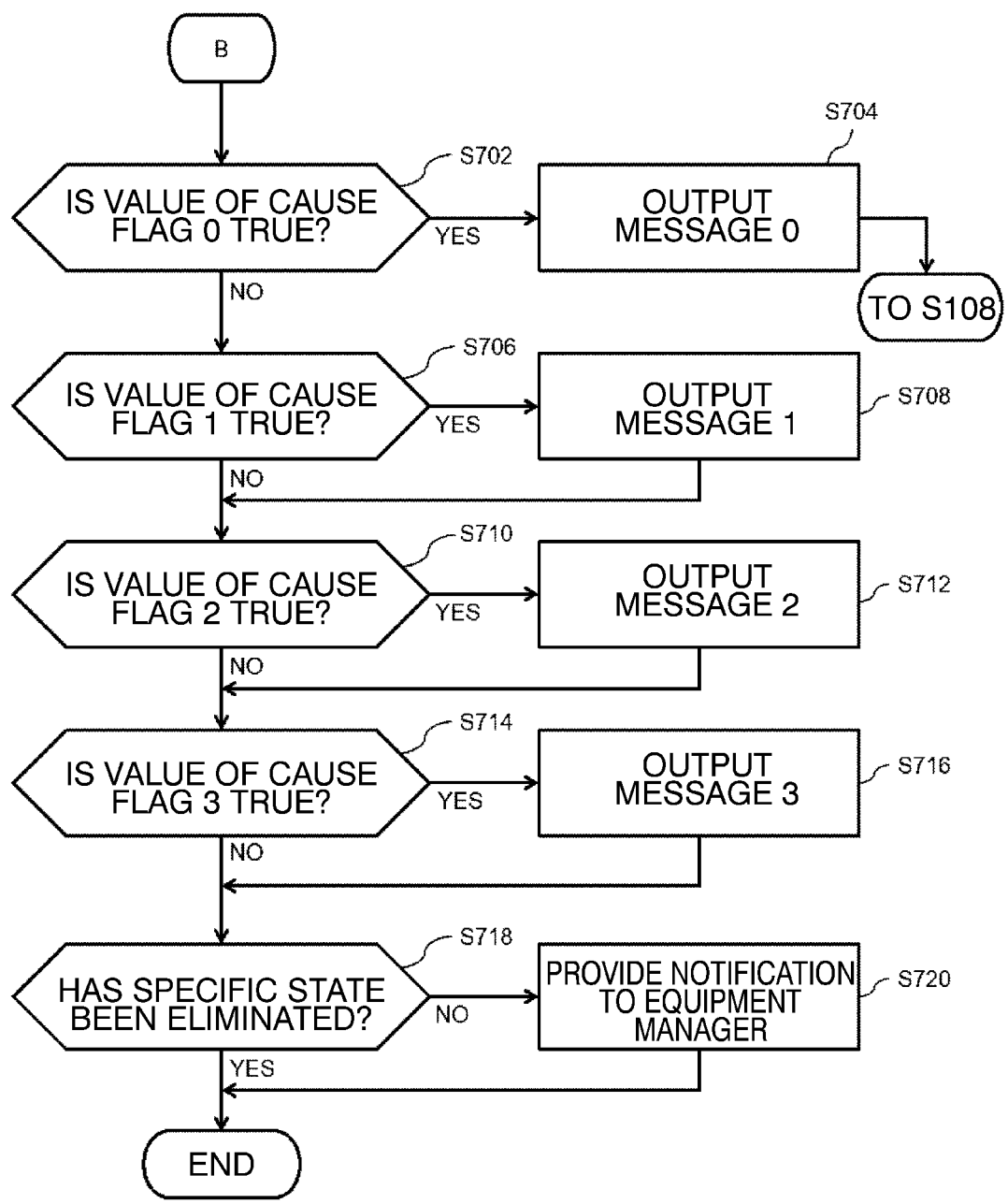
FIG. 11 is a flowchart illustrating a flow in which the countermeasure process execution unit supports manual trouble-shooting work by outputting a message to a person within a conference room.

In the flowchart of FIG. 9, cause flags from "cause flag 0" to "cause flag 3" are causes related to hardware settings that are not related to software settings of the video equipment 22. Thus, when these causes have been estimated, it is necessary for the person in the conference room to correct a hardware setting error. Therefore, the countermeasure process execution unit 140 outputs a message for providing a notification of a point or the like to be checked to eliminate the estimated cause using the smart speaker 4 and supports a person who actually eliminates the trouble in the conference room. FIG. 11 is a flowchart illustrating a flow in which the countermeasure process execution unit 140 supports manual trouble-shooting work by outputting a message to a person within the conference room.

First, the countermeasure process execution unit 140 determines whether or not the value of cause flag 0 is "true" (S702). When the value of cause flag 0 is "true," it indicates that the video equipment 22 is not correctly connected to the LAN 50 and the equipment information cannot be acquired from the video equipment 22. Because equipment information is required to identify the cause of the trouble related to the output of the video equipment 22, when the value of cause flag 0 is "true" (S702: YES), the countermeasure process execution unit 140 reads data of a message for prompting a person to confirm a LAN connection state of the video equipment 22 (referred to as "message 0" in FIG. 11) and outputs message 0 via the smart speaker 4 (S704). Message 0 is, for example, "Please confirm that the video equipment is properly connected to the network. Is it okay . . . ?". Such data of message 0 is stored in advance in a storage area of the equipment management device 10 such as the memory 1030 or the storage device 1040. When it is confirmed that the person in the conference room has correctly connected the video equipment 22 to the LAN 50, the equipment management device 10 outputs a request for transmitting equipment information to the video equipment 22 again and acquires the equipment information from the video equipment 22 (S108 in FIG. 3). Subsequently, the process of estimating a cause on the basis of the equipment information acquired from the video equipment 22 as described with reference to FIG. 5 is executed again.

On the other hand, when a value of cause flag 0 is "false" (S702: NO), the equipment management device 10 can acquire the equipment information from the video equipment 22 because the video equipment 22 is correctly connected to the LAN 50. In this case, a determination process related to cause flags 1 to 3 is executed in the flowchart of FIG. 9. Therefore, the countermeasure process execution unit 140 determines whether or not the value of cause flag 1 is "true" (S706). When the value of cause flag 1 is "true," it indicates that a main power supply of the video equipment 22 is turned off. When the value of cause flag 1 is "true" (S706: YES), the countermeasure process execution unit 140 reads data of a message for prompting a person to confirm the ON/OFF state of the main power supply of the video equipment 22 (referred to as "message 1" in FIG. 11) and outputs message 1 via the smart speaker 4 (S708). Message 1 is, for example, "Is the power supply of the video equipment turned on?", "Please turn on the power supply of the video equipment. Is it okay . . . ?", or the like. Such data of message 1 is stored in advance in a storage area of the equipment management device 10, such as the memory 1030 or the storage device 1040.

The countermeasure process execution unit 140 determines whether or not the value of cause flag 2 is "true" when the value of cause flag 1 is "false" (S706: NO) or when a person in the conference room has made a positive response to message 1 from a sound picked up by the smart speaker 4 (S710). When the value of cause flag 2 is "true," it indicates that the video equipment 22 is incompatible with the image transmission application. When the value of cause flag 2 is "true" (S710: YES), the countermeasure process execution unit 140 reads data of a message for prompting a person to change a transmission path of a signal for the video equipment 22 (referred to as "message 2" in FIG. 11) and outputs message 2 via the smart speaker 4 (S712). Message 2 is, for example, "The video equipment is incompatible with the image transmission application. Please make a connection using another method." The data of this message 2 is stored in advance in a storage area of the equipment management device 10 such as the memory 1030 or the storage device 1040.

When the value of cause flag 2 is "false" (S710: NO), the countermeasure process execution unit 140 determines whether or not the value of cause flag 3 is "true" (S714). When the value of cause flag 3 is "true," it indicates that the video equipment 22 and the terminal 70 are not paired. When the value of cause flag 3 is "true" (S714: YES), the countermeasure process execution unit 140 reads data of a message for solving the problem related to the pairing between the terminal 70 and the video equipment 22 (referred to as "message 3" in FIG. 11) and outputs message 3 via the smart speaker 4 (S716). Message 3 is, for example, "When the video equipment cannot be found in the image transmission application, please designate an IP address (xxx. xxx. xxx. xxx) and perform a search. OK?" Such data of message 3 is stored in advance in a storage area of the equipment management device 10 such as the memory 1030 or the storage device 1040. Also, regarding the message exemplified here, the countermeasure process execution unit 140 can set the IP address of the video equipment 22 on the basis of information of the video equipment 22 registered in advance in the equipment management device 10.

When the value of cause flag 3 is "false" or when it is detected that the person in the conference room has made the positive response to message 3 from a sound picked up by the smart speaker 4, the countermeasure process execution unit 140 determines whether or not the specific state has been eliminated (S718). The countermeasure process execution unit 140 can determine that the specific state has been eliminated, for example, when a result of analyzing a video acquired from the imaging device 30 indicates that an output of the video from the video equipment 22 can be detected or when a result of analyzing a sound acquired from the smart speaker 4 indicates that a prescribed keyword (such as "repaired" or "(a video or sound) output") can be detected. Here, when the specific state has been eliminated (S718: YES), the countermeasure process execution unit 140 ends the process. On the other hand, when the specific state has not been eliminated (S718: NO), the countermeasure process execution unit 140 notifies a terminal of a person in charge (an equipment manager) who manages various types of equipment installed in the conference room that the trouble of the video equipment 22 has occurred (S720). Thereby, when the trouble of the video equipment 22 (equipment provided in the conference room) cannot be eliminated and remains, it is possible to call the equipment manager who is familiar with the equipment including the video equipment 22 and try to eliminate the trouble at an early stage.

As described above, as illustrated in FIG. 11, when a cause related to a hardware state of the video equipment 22 (equipment provided in the conference room) has been estimated, an interactive message is output using the smart speaker 4. Thereby, the person in the conference room is estimated to smoothly perform the work for eliminating the trouble caused by the hardware state of the video equipment 22.

Although the embodiments of the present invention have been described above with reference to the drawings, the present invention should not be construed as being limited thereto and various changes and improvements and the like can be made on the basis of the knowledge of those skilled in the art without departing from the scope and spirit of the present invention.

For example, in the above example, the process of estimating the cause of the trouble (example: FIGS. 5 and 9), the process of automatically eliminating the trouble (example: FIGS. 6 and 10), and the process of manually eliminating the trouble (example: FIGS. 7 and 11) are executed together, but the estimation and elimination of the cause may be sequentially executed for each cause.

Also, the countermeasure process execution unit 140 may be configured to collect additional information from a person in the conference room and execute a further countermeasure process using the additional information. Here, a case where a specific state in which "no video is output" occurs due to a state in which "there is no input signal for the video equipment" is considered. In this case, for example, a cause in which "there is no input signal for the video equipment" is sub-divided into a plurality of more detailed causes such as a cause in which "the video equipment and the source device are not connected by a cable" and a cause in which "the cable connecting the video equipment and the source device is abnormal." When an inquiry-type message such as "Please connect your terminal and the video equipment with a cable. Is it okay . . . ?" has been output, the countermeasure process execution unit 140 collects a response sound from a person within a conference room using a sound collection device such as the smart speaker 4 or the like as additional information. Here, when additional information indicating affirmation is obtained with respect to the previous message, the countermeasure process execution unit 140 can determine that a specific state has occurred due to a cause other than the cause in which "the video equipment and the source device are not connected by a cable." In other words, the countermeasure process execution unit 140 can narrow down the number of causes for a specific state using the collected additional information. The countermeasure process execution unit 140 outputs a further message such as "Please replace the cable connected to the video equipment with another cable. Is it okay . . . ?". According to this configuration, it is possible to take appropriate countermeasures against a specific state (trouble) that has occurred in the equipment provided in the conference room.

Also, appropriate combinations of a plurality of components disclosed in the embodiments can form various inventions. For example, one or more components among all the components shown in the embodiments can be omitted. The components can be appropriately combined over the different embodiments.

Although a plurality of processing steps (processes) have been described in order in the flowcharts used in the above description, the order in which the processing steps are executed in each embodiment is not limited to the order described in the embodiments. In each embodiment, the order of the processing steps shown in the drawing can be changed in a range without causing a problem in content. Also, the above-described embodiments can be combined in a range in which content does not conflict.

Although some or all of the above-described embodiments can be described as in the following appendixes, the present invention is not limited to the following appendixes.

1. An equipment management device including:
    an information collection unit configured to acquire a video of a conference room or a sound of the conference room;
    a specific state detection unit configured to detect that equipment provided in the conference room is in a specific state on the basis of a result of analyzing the video or the sound;
    a cause estimation unit configured to acquire equipment information about the equipment when the equipment has been detected to be in the specific state and estimate a cause of the specific state on the basis of the equipment information; and
    a countermeasure process execution unit configured to select and execute a countermeasure process to be executed on the basis of the estimated cause.

2. The equipment management device according to appendix 1,
    wherein, when the estimated cause is associated with a software setting of the equipment, the countermeasure process execution unit executes a process of generating a control signal for changing the software setting of the equipment and transmitting the control signal to the equipment, and
    wherein, when the estimated cause is not associated with a software setting of the equipment, the countermeasure process execution unit executes a process of outputting a message related to an item to be checked to eliminate the estimated cause via an output device.

3. The equipment management device according to appendix 2, wherein the countermeasure process execution unit executes the process of outputting the message when the specific state has not been eliminated according to the control signal for changing the software setting of the equipment.

4. The equipment management device according to appendix 3, wherein the countermeasure process execution unit provides a notification to a terminal of a person who manages the equipment when the specific state has not been eliminated according to a countermeasure that has been performed by a person within the conference room in accordance with the message.

5. The equipment management device according to any one of appendixes 1 to 4, wherein the equipment information is information indicating a state of hardware or software of the equipment.

6. The equipment management device according to appendix 5, wherein, when the equipment is video equipment, the equipment information includes at least one of information indicating a network connection state of the video equipment, information indicating a power supply state of the video equipment, information indicating presence or absence of an input signal for the video equipment, information indicating a selection state of an input port that receives the input signal, information indicating an execution state of a video or sound mute function, information indicating availability of an image transmission application, and information indicating a reception state of a search command from external equipment that transmits a video signal.

7. The equipment management device according to any one of appendixes 1 to 6,
wherein the countermeasure process execution unit acquires additional information when a plurality of causes have been estimated, and
wherein the countermeasure process execution unit selects and executes a further countermeasure process using the additional information.

8. The equipment management device according to appendix 7, wherein the additional information is acquired by receiving an answer to a question selected on the basis of the plurality of causes that have been estimated from any one device within the conference room.

9. The equipment management device according to any one of appendixes 1 to 8, wherein the countermeasure process execution unit selects the countermeasure process to be executed using information stored in association with each piece of content of a specific state in which a cause of the specific state and a countermeasure process for the cause are assumed with respect to the equipment.

10. An equipment management method including:
acquiring, by a computer, a video of a conference room or a sound of the conference room;
detecting, by the computer, that equipment provided in the conference room is in a specific state on the basis of a result of analyzing the video or the sound;
acquiring, by the computer, equipment information about the equipment when the equipment has been detected to be in the specific state and estimating a cause of the specific state on the basis of the equipment information; and
selecting and executing, by the computer, a countermeasure process to be executed on the basis of the estimated cause.

11. The equipment management method according to appendix 10, including:

when the estimated cause is associated with a software setting of the equipment, executing, by the computer, a process of generating a control signal for changing the software setting of the equipment and transmitting the control signal to the equipment, and
when the estimated cause is not associated with a software setting of the equipment, executing, by the computer, a process of outputting a message related to an item to be checked to eliminate the estimated cause via an output device.

12. The equipment management method according to appendix 11, including executing, by the computer, the process of outputting the message when the specific state has not been eliminated according to the control signal for changing the software setting of the equipment.

13. The equipment management method according to appendix 12, including providing, by the computer, a notification to a terminal of a person who manages the equipment when the specific state has not been eliminated according to a countermeasure that has been performed by a person within the conference room in accordance with the message.

14. The equipment management method according to any one of appendixes 10 to 13, wherein the equipment information is information indicating a state of hardware or software of the equipment.

15. The equipment management method according to appendix 14, wherein, when the equipment is video equipment, the equipment information includes at least one of information indicating a network connection state of the video equipment, information indicating a power supply state of the video equipment, information indicating presence or absence of an input signal for the video equipment, information indicating a selection state of an input port that receives the input signal, information indicating an execution state of a video or sound mute function, information indicating availability of an image transmission application, and information indicating a reception state of a search command from external equipment that transmits a video signal.

16. The equipment management method according to any one of appendixes 10 to 15, including
acquiring, by the computer, additional information when a plurality of causes have been estimated, and
selecting and executing, by the computer, a further countermeasure process using the additional information.

17. The equipment management method according to appendix 16, wherein the additional information is acquired by receiving an answer to a question selected on the basis of the plurality of causes that have been estimated from any one device within the conference room.

18. The equipment management method according to any one of appendixes 10 to 17, including selecting, by the computer, the countermeasure process to be executed using information stored in association with each piece of content of a specific state in which a cause of the specific state and a countermeasure process for the cause are assumed with respect to the equipment.

19. A program for causing a computer to function as:
an information collection unit configured to acquire a video of a conference room or a sound of the conference room;
a trouble detection unit configured to detect that equipment provided in the conference room is in a specific state on the basis of a result of analyzing the video or the sound;
a cause estimation unit configured to acquire equipment information about the equipment when the equipment has been detected to be in the specific state and estimate a cause of the specific state on the basis of the equipment information; and a countermeasure process execution unit configured to select and execute a countermeasure process to be executed on the basis of the estimated cause.

20. The program according to appendix 19, wherein, when the estimated cause is associated with a software setting of the equipment, the countermeasure process execution unit executes a process of generating a control signal for changing the software setting of the equipment and transmitting the control signal to the equipment, and wherein, when the estimated cause is not associated with a software setting of the equipment, the countermeasure process execution unit executes a process of outputting a message related to an item to be checked to eliminate the estimated cause via an output device.

21. The program according to appendix 20, wherein the countermeasure process execution unit executes the process of outputting the message when the specific state has not been eliminated according to the control signal for changing the software setting of the equipment.

22. The program according to appendix 21, wherein the countermeasure process execution unit provides a notification to a terminal of a person who manages the equipment when the specific state has not been eliminated according to a countermeasure that has been performed by a person within the conference room in accordance with the message.

23. The program according to any one of appendixes 19 to 22, wherein the equipment information is information indicating a state of hardware or software of the equipment.

24. The program according to appendix 23, wherein, when the equipment is video equipment, the equipment information includes at least one of information indicating a network connection state of the video equipment, information indicating a power supply state of the video equipment, information indicating presence or absence of an input signal for the video equipment, information indicating a selection state of an input port that receives the input signal, information indicating an execution state of a video or sound mute function, information indicating availability of an image transmission application, and information indicating a reception state of a search command from external equipment that transmits a video signal.

25. The program according to any one of appendixes 19 to 24, wherein the countermeasure process execution unit acquires additional information when a plurality of causes have been estimated, and wherein the countermeasure process execution unit selects and executes a further countermeasure process using the additional information.

26. The program according to appendix 25, wherein the additional information is acquired by receiving an answer to a question selected on the basis of the plurality of causes that have been estimated from any one device within the conference room.

27. The program according to any one of appendixes 19 to 26, wherein the countermeasure process execution unit selects the countermeasure process to be executed using information stored in association with each piece of content of a specific state in which a cause of the specific state and a countermeasure process for the cause are assumed with respect to the equipment.

REFERENCE SIGNS LIST

10 Information processing device
1010 Bus
1020 Processor
1030 Memory
1040 Storage device
1050 Input/output interface
1060 Network interface
110 Information collection unit
120 Specific state detection unit
130 Cause estimation unit
140 Countermeasure process execution unit
20 Video equipment
30 Imaging device
4 Smart speaker
40 Microphone
42 Speaker
50 LAN
60 Access point
70 Terminal

What is claimed is:

1. An equipment management device comprising:

an information collection unit configured to acquire a video of a conference room or a sound of the conference room, the information collection unit comprising a network interface configured to be connectable through a network to an equipment in the conference room, the equipment being configured to output at least one of the video or the sound of the conference room;

a specific state detection unit configured to receive at least one of the video or the sound that the information collection unit acquired, and to analyze the at least one of the video or the sound to detect that equipment in the conference room is in a specific state in which the equipment does not work normally, on the basis of a result of analyzing the video or the sound;

a cause estimation unit configured to acquire equipment information about the equipment when the specific state detection unit detected the equipment to be in the specific state and to estimate whether or not a cause of the specific state is associated with a software setting of the equipment, on the basis of the equipment information; and a countermeasure process execution unit configured to execute a process of generating a control signal for changing the software setting of the equipment and to transmit the control signal to the equipment if the cause estimation unit estimated that the cause of the specific state is associated with the software setting of the equipment, and the countermeasure process execution unit being configured to output a message related to an item to be checked to eliminate the estimated cause, if the cause estimation unit estimated that the cause of the specific state is associated with the software setting of the equipment to correct an error in the equipment.

2. The equipment management device according to claim 1, wherein, when the estimated cause is associated with a software setting of the equipment, the countermeasure process execution unit executes a process of generating a control signal for changing the software setting of the equipment and transmitting the control signal to the equipment, and wherein, when the estimated cause is not associated with a software setting of the equipment, the countermeasure process execution unit executes a process of outputting a message related to an item to be checked to eliminate the estimated cause via an output device.

3. The equipment management device according to claim 2, wherein the countermeasure process execution unit executes the process of outputting the message when the specific state has not been eliminated according to the control signal for changing the software setting of the equipment.

4. The equipment management device according to claim 3, wherein the countermeasure process execution unit provides a notification to a terminal of a person who manages the equipment when the specific state has not been eliminated according to a countermeasure that has been performed by a person within the conference room in accordance with the message.

5. The equipment management device according to claim 1, wherein the equipment information is information indicating a state of hardware or software of the equipment.

6. The equipment management device according to claim 5, wherein, when the equipment is video equipment, the equipment information includes at least one of information indicating a network connection state of the video equipment, information indicating a power supply state of the video equipment, information indicating presence or absence of an input signal for the video equipment, information indicating a selection state of an input port that receives the input signal, information indicating an execution state of a video or sound mute function, information indicating availability of an image transmission application, and information indicating a reception state of a search command from external equipment that transmits a video signal.

7. The equipment management device according to claim 1,
wherein the countermeasure process execution unit acquires additional information when a plurality of causes have been estimated, and
wherein the countermeasure process execution unit selects and executes a further countermeasure process using the additional information.

8. The equipment management device according to claim 7, wherein the additional information is acquired by receiving an answer to a question selected on the basis of the plurality of causes that have been estimated from any one device within the conference room.

9. The equipment management device according to claim 1, wherein the countermeasure process execution unit selects the countermeasure process to be executed using information stored in association with each piece of content of a specific state in which a cause of the specific state and a countermeasure process for the cause are assumed with respect to the equipment.

10. The equipment management device according to claim 1,
wherein the equipment has the software setting changed by the countermeasure process execution unit when the cause estimation unit estimated that the cause of the specific state is associated with the software setting of the equipment to correct a hardware setting error of the equipment.

11. The equipment management device according to claim 1,
wherein the error in the equipment is corrected by the countermeasure process execution unit outputting the message related to the item to be checked to eliminate the estimated cause, when the cause estimation unit estimated that the cause of the specific state is associated with the software setting of the equipment.

12. An equipment management method comprising:
acquiring a video of a conference room or a sound of the conference room;
detecting that equipment provided in the conference room is in a specific state on the basis of a result of analyzing the video or the sound;
acquiring equipment information about the equipment when the equipment to be in the specific state and to estimating whether or not a cause of the specific state is associated with a software setting of the equipment, on the basis of the equipment information; and
selecting and executing a countermeasure process to be executed on the basis of the estimated cause to correct an error in the equipment, the countermeasure process comprising to execute a process of generating a control signal for changing the software setting of the equipment and to transmit the control signal to the equipment if the cause of the specific state is associated with the software setting of the equipment, and to output a message related to an item to be checked to eliminate the estimated cause, if the cause estimation unit estimated that the cause of the specific state is associated with the software setting of the equipment to correct the error in the equipment.

13. The equipment management method according to claim 12,
wherein the equipment has the software setting changed by the countermeasure process when it is estimated that the cause of the specific state is associated with the software setting of the equipment to correct a hardware setting error of the equipment.

14. The equipment management method according to claim 12,
wherein the error in the equipment is corrected by the countermeasure process outputting the message related to the item to be checked to eliminate the estimated cause, when it is estimated that the cause of the specific state is associated with the software setting of the equipment.

15. The equipment management method according to claim 12,
wherein the acquiring the video of the conference room or the sound of the conference room is by a network interface configured to be connectable through a network to an equipment in the conference room, the equipment being configured to output at least one of the video or the sound of the conference room,
further comprising receiving at least one of the video or the sound that the analyzing the at least one of the video or the sound to detect that equipment in the conference room is in a specific state in which the equipment does not work normally, on the basis of a result of analyzing the video or the sound.

16. A non-transitory computer readable storage medium that includes a computer program for causing a computer to perform:
acquire a video of a conference room or a sound of the conference room;
detect that equipment provided in the conference room is in a specific state on the basis of a result of analyzing the video or the sound;
acquire equipment information about the equipment when the equipment to be in the specific state and to estimate whether or not a cause of the specific state is associated with a software setting of the equipment, on the basis of the equipment information; and
select and execute a countermeasure process to be executed on the basis of the estimated cause to correct an error in the equipment, the countermeasure process comprising to execute a process of generating a control signal for changing the software setting of the equipment and to transmit the control signal to the equipment if the cause of the specific state is associated with the software setting of the equipment, and to output a message related to an item to be checked to eliminate the estimated cause, if the cause estimation unit estimated that the cause of the specific state is associated with the software setting of the equipment to correct the error in the equipment.

17. The non-transitory computer readable storage medium that includes the computer program according to claim 16, wherein the equipment has the software setting changed by the countermeasure process when the cause of the specific state is associated with the software setting of the equipment to correct a hardware setting error of the equipment.

18. The non-transitory computer readable storage medium that includes the computer program according to claim 16, wherein the error in the equipment is corrected by the countermeasure process outputting the message related to the item to be checked to eliminate the estimated cause, when the it is estimated that the cause of the specific state is associated with the software setting of the equipment.

19. The non-transitory computer readable storage medium that includes the computer program according to claim 16, wherein the acquiring the video of the conference room or the sound of the conference room is by a network interface configured to be connectable through a network to an equipment in the conference room, the equipment being configured to output at least one of the video or the sound of the conference room,
wherein the computer program for causing the computer to perform to receive at least one of the video or the sound that the analyzing the at least one of the video or the sound to detect that equipment in the conference room is in a specific state in which the equipment does not work normally, on the basis of a result of analyzing the video or the sound.

* * * * *